US012440469B2

(12) United States Patent
Stage

(10) Patent No.: US 12,440,469 B2
(45) Date of Patent: Oct. 14, 2025

(54) P-gp INDUCERS AS PROTECTORS AGAINST CHEMOTHERAPY-INDUCED SIDE EFFECTS, SUCH AS PERIPHERAL NEUROPATHY (CIPN) AND HAIR LOSS

(71) Applicant: Syddansk Universitet, Odense M (DK)

(72) Inventor: Tore Bjerregaard Stage, Odense SV (DK)

(73) Assignee: Syddansk Universitet, Odense M (DK)

( * ) Notice: Subject to any disclaimer, the term of this patent is extended or adjusted under 35 U.S.C. 154(b) by 735 days.

(21) Appl. No.: 17/639,154

(22) PCT Filed: Aug. 28, 2020

(86) PCT No.: PCT/EP2020/074042
§ 371 (c)(1),
(2) Date: Feb. 28, 2022

(87) PCT Pub. No.: WO2021/043673
PCT Pub. Date: Mar. 11, 2021

(65) Prior Publication Data
US 2022/0313649 A1    Oct. 6, 2022

(30) Foreign Application Priority Data

Sep. 2, 2019 (EP) .................... 19194881

(51) Int. Cl.
| A61K 31/337 | (2006.01) |
|---|---|
| A61K 9/00 | (2006.01) |
| A61K 31/475 | (2006.01) |
| A61K 31/55 | (2006.01) |
| A61K 31/57 | (2006.01) |
| A61P 17/14 | (2006.01) |
| A61P 25/02 | (2006.01) |
| A61P 35/00 | (2006.01) |

(52) U.S. Cl.
CPC .......... *A61K 31/337* (2013.01); *A61K 9/0014* (2013.01); *A61K 31/475* (2013.01); *A61K 31/55* (2013.01); *A61K 31/57* (2013.01); *A61P 17/14* (2018.01); *A61P 25/02* (2018.01); *A61P 35/00* (2018.01)

(58) Field of Classification Search
CPC .. A61K 31/337; A61K 9/0014; A61K 31/475; A61K 31/55; A61K 31/57; A61P 17/14; A61P 25/02; A61P 35/00
See application file for complete search history.

(56) References Cited

U.S. PATENT DOCUMENTS 9,005,678 B1    4/2015    Cao et al.

FOREIGN PATENT DOCUMENTS

| EP | 1925304 A1 | 5/2008 | |
|---|---|---|---|
| WO | WO 03/020227 A1 | 3/2003 | |
| WO | WO 2012/149267 A1 | 11/2012 | |
| WO | WO-2012177440 A1 * | 12/2012 | ....... A61K 39/39558 |
| WO | WO 2014/153505 A2 | 9/2014 | |
| WO | WO 2017/165806 A1 | 9/2017 | |
| WO | WO 2018/106107 A1 | 6/2018 | |

OTHER PUBLICATIONS

Saito et al., Inhibitory Effect of Cyclosporin A on p-Glycoprotein Function in Peripheral Nerves of Mice Treated with Doxorubicin and Vinblastine, Acta Otolaryngol, 2004; 124:313-317 (Year: 2004).*
Wijnholds, Drug Resistance Caused by Multidrug-Resistance Associated Proteins, Novartis Foundation Symposium, Feb. 2002 (Year: 2002).*
Von Delius, Investigational New Drugs, vol. 25, pp. 173-180, 2007 (Year: 2007).*
Barton, Support Care Cancer, Jun. 2011, 19 (6): 833-841 (Year: 2011).*
Haslam, Iain S. et al., "Protection against chemotherapy-induced alopecia: targeting ATP-binding cassette transporters in the hair follicle?" Trends in Pharmacological Sciences, Nov. 2013, pp. 599-604, vol. 34, No. 11.
Haslam, I.S. et al., "Differential expression and functionality of ATP-binding cassette transporters in the human hair follicle" British Journal of Dermatology, 2015, pp. 1562-1572, vol. 172.
Argyriou, Andreas A. et al., "Chemotherapy-induced peripheral neurotoxicity (CIPN): An update" Critical Reviews in Oncology/Hematology, 2012, pp. 51-77, vol. 82.
Barton, Debra L. et al., "A double-blind, placebo-controlled trial of a topical treatment for chemotherapy-induced peripheral neuropathy: NCCTG trial N06CA" Support Care Cancer, Jun. 2011, pp. 833-841, vol. 19, No. 6.
Brooks, Tracy et al., "Taxane-based reversal agents modulate drug resistance mediated by P-glycoprotein, multidrug resistance protein, and breast cancer resistance protein" Molecular Cancer Therapeutics, 2003, pp. 1195-1205, vol. 2.
Flatters, S.J.L. et al., "Clinical and preclinical perspectives on Chemotherapy-Induced Peripheral Neuropathy (CIPN): a narrative review" British Journal of Anaesthesia, 2017, pp. 737-749, vol. 119, No. 4.
Horio, Masaru et al., "Transepithelial Transport of Drugs by the Multidrug Transporter in Cultured Madin-Darby Canine Kidney Cell Epithelia" The Journal of Biological Chemistry, Sep. 1989, pp. 14880-14884, vol. 264, No. 25.

(Continued)

*Primary Examiner* — Andrew D Kosar
*Assistant Examiner* — Phillip Matthew Rzeczycki
(74) *Attorney, Agent, or Firm* — Knobbe, Martens Olson & Bear, LLP

(57) ABSTRACT

The present invention relates to compositions comprising a P-gp inducer, for topical use in preventing one or more side effects of chemotherapeutics, which chemotherapeutics are transported out of cells by P-gp. Especially chemotherapy-induced peripheral neuropathy (CIPN) is a relevant side effect to treat/avoid, since CIPN may be a dose limiting side effect of chemotherapy. The invention also relates to kits and to cancer treatment of a subgroup of patients, which subgroup has been topically pretreated with a P-gp inducer.

18 Claims, 11 Drawing Sheets

(56) References Cited

OTHER PUBLICATIONS

O'Connor, Robert et al., "The interaction of bortezomib with multidrug transporters: implications for therapeutic applications in advanced multiple myeloma and other neoplasias" Cancer Chemother Pharmacol, May 2013, pp. 1357-1368, vol. 71, No. 5.

Saito, Takehisa et al., "P-glycoprotein expression in capillary endothelial cells of the 7th and $8^{th}$ nerves of guinea pig in relation to blood-nerve barrier sites" Neuroscience Letters, 1997, pp. 41-44, vol. 232.

Saito, Takehisa et al., "Homozygous Disruption of the mdr1a P-glycoprotein Gene Affects Blood-Nerve Barrier Function in Mice Administered with Neurotoxic Drugs" Acta Otolaryngol, 2001, pp. 735-742, vol. 121.

Shen, H. et al., "Ixabepilone, a Novel Microtubule-Targeting Agent for Breast Cancer, Is a Substrate for P-Glycoprotein (P-gp/MDR1/ABCB1) but not Breast Cancer Resistance Protein (BCRP/ABCG2)" The Journal of Pharmacology and Experimental Therapeutics, 2011, pp. 423-432, vol. 337, No. 2.

Staff, Nathan P. et al., "Chemotherapy-Induced Peripheral Neuropathy: A Current Review" Ann Neurol., 2017, pp. 772-781, vol. 81, No. 6.

Stage, Tore B. "P-gp Inhibition Increases Neuronal Toxicity of Paclitaxel in SH-SY5Y-Derived Neurons" SDU.

Von Delius, Stefan et al., "Carbamazepine for prevention of oxaliplatin-related neurotoxicity in patients with advanced colorectal cancer: Final results of a randomised, controlled, multicenter phase II study" Invest New Drugs, 2007, pp. 173-180, vol. 25.

"P-glycoprotein" Jun. 2019—XP-002797678—pp. 1-12 https://web.archive.org/web/20190607015853/https://en. wikipedia.org/wiki/P-glycoprotein.

International Search Report for PCT/EP2020/074042 dated Nov. 13, 2020.

\* cited by examiner

P-gp INDUCERS AS PROTECTORS AGAINST CHEMOTHERAPY-INDUCED SIDE EFFECTS, SUCH AS PERIPHERAL NEUROPATHY (CIPN) AND HAIR LOSS

CROSS REFERENCE TO RELATED APPLICATION

This application is a U.S. National Phase Application of PCT International Application Number PCT/EP2020/074042, filed on Aug. 28, 2020, designating the United States of America and published in the English language, which is an International Application of and claims the benefit of priority to European Patent Application No. 19194881.9, filed on Sep. 2, 2019. The disclosures of the above-referenced applications are hereby expressly incorporated by reference in their entireties.

TECHNICAL FIELD OF THE INVENTION

The present invention relates to compositions comprising P-gp inducers and/or MRP1 inducers for use in protection against side effects of chemotherapy, such as chemotherapy-induced peripheral neuropathy (CIPN), wherein the inducer is to be topically applied. The invention also relates to improved treatment of a subgroup of cancers patients, who have been topically pretreated with a P-gp inducer and/or MRP1 inducer.

BACKGROUND OF THE INVENTION

A known side effect of many cytotoxic anticancer drugs is the development of Chemotherapy-induced peripheral neuropathy (CIPN). Clinical signs of CIPN include sensory loss, paresthesia, dysesthesia, numbness and tingling and often leads to neuropathic pain. Another known side effect is hair loss (*alopecia*).

Paclitaxel is a cytotoxic anticancer drug used in the treatment of solid organ tumours such as breast cancer and ovarian cancer. Paclitaxel is also used in adjuvant and neoadjuvant chemotherapy. While effective, paclitaxel provokes multiple side effects in patients. A common and potentially serious adverse reaction to treatment with paclitaxel is peripheral neuropathy, which occurs in up to 50% of all patients. CIPN can be very serious, but even mild to moderate symptoms may persist for several years after treatment cessation, significantly impairing quality of life. With more than 80% of breast cancer patients expected to be long-term survivors, this severe and long-lasting adverse reaction is particularly concerning and of public health interest. Further, treatment success with paclitaxel is correlated to dose and CIPN is the major reason for dose reduction, the development of CIPN may influence survival rates among cancer patients.

Hair loss (*alopecia*) is another known side effect of Paclitaxel. While less impactful on treatment success, hair loss presents a substantial psychological issue for cancer patients and survivors. Hair loss is also costly for the healthcare providers as wigs are needed for the patients.

Although described in higher detail for Paclitaxel above, other drugs or groups of drugs may also induce CIPN and/or hair loss (*alopecia*), such as other taxanes (e.g. docetaxel), *vinca* alkaloids (e.g. vincristine), epothilones (e.g. ixabepilone) and proteasome inhibitors (e.g. bortezomib).

WO 2018/106107 A1 discloses the treatment of chemotherapy-induced peripheriral neuropathy (CIPN) derived from vincristine, etoposide and bortezumab by applying topical phenytoin. Thus, WO 2018/106107 A1 relates to treatment of CIPN not prevention of side effects arising from chemotherapeutics, such as CIPN.

U.S. Pat. No. 9,005,678 B1 reports on carbamazepine in combination with oxaliplatin for reducing CIPN derived from the anticancer agent. U.S. Pat. No. 9,005,678 B1 is silent in respect of topically applying a P-gp inducer before administering a chemotherapeutic.

WO 2017/165806 A1 relates to treatment of CIPN not prevention of side effects arising from chemotherapeutics, such as CIPN. WO 2017/165806 A1 is silent in respect of topically applying P-gp inducer before administering a chemotherapeutic.

Thus, in order to increase quality of life and improve treatment outcomes among patients treated with certain cytotoxic anticancer drugs, methods for preventing or reducing side effects are needed.

Hence, improved methods for preventing and/or reducing side effects of chemotherapy (such as CIPN) would be advantageous, and in particular, a more efficient and/or reliable treatment regime for preventing CIPN or hair loss would be advantageous.

SUMMARY OF THE INVENTION

The present invention relates to the realization that dermal/topical application of a drug that induces P-gp and/or MRP1 can prevent side effects of chemotherapeutics which are transported out of cells by P-gp and/or MRP1, if applied before a chemotherapy treatment is initiated.

For example, the present invention describes that topical application (preferably to the hands and feet of a subject) of a drug that induces P-gp and/or MRP1 in the sensory neurons, can prevent CIPN if applied before a chemotherapy treatment is initiated.

Similar, the present invention discloses that topical application (preferably to the scalp, eyebrows, etc.) of a drug that induces P-gp and/or MRP1, can prevent *alopecia*, if applied before a chemotherapy treatment is initiated.

The application of the P-gp and/or MRP1 inducer prevents chemotherapy accumulation in the cells close to the skin surface (such as sensory neurons and hair follicles) by increasing the transport of chemotherapy out of the cells and therefore protects against local cell damage. This approach can be used for chemotherapeutics (e.g. vincristine, bortezomib and ixabepilone) that are transported out of cells by P-gp and/or MRP1 and which may cause e.g. peripheral neurotoxicity or *alopecia*.

Systemic induction of P-gp is undesirable, as this would lead to protection of tumours from chemotherapeutic drugs. However, local induction (e.g. by topical application) presents a novel mechanism to reduce accumulation of chemotherapy in e.g. sensory neurons and hair follicles that are damaged by chemotherapy.

Example 1 shows that the chemotherapeutic Paclitaxel affects neuronal morphology.

Example 2 shows that P-gp inhibition increases intracellular concentrations of paclitaxel (opposite effect of the present invention where an inducer is used).

Example 3 shows that P-gp inhibitors causes increased risk of peripheral neuropathy among patients treated with paclitaxel.

Example 4 shows that induction of P-gp and MRP1 with rifampicin protects cells from paclitaxel induced CIPN, thereby confirming the desired effect of the present invention.

Example 5 shows that inhibiting the efflux transporter MRP1 leads to substantially increased neurotoxicity of the chemotherapeutic vincristine (opposite effect of the present invention where an inducer is used).

Example 6 shows that induction of P-gp and MRP1 with rifampicin protects cells from vincristine induced CIPN, thereby confirming the desired effect of the present invention.

Example 7 shows that treatment with paclitaxel leads to increased expression of pain receptors and stress-factors in cells and that this response is alleviated in cells pretreated with rifampicin.

Example 8 shows that Rifampicin pretreatment leads to reduced intracellular accumulation of paclitaxel.

Example 9 shows that drugs that bind to and activate PXR (exemplified by carbamazepine and dexamethasone), increase expression of P-gp in sensory neurons derived from induced pluripotent stem cells.

Example 10 shows that rifampicin also increases expression of P-gp in other cells in the peripheral nervous system, namely Schwann cell precursors derived from induced pluripotent stem cells.

To summarize, the present invention relates to compositions comprising a P-gp inducer and/or MRP1 inducer, for topical use in preventing one or more side effects of chemotherapeutics, which chemotherapeutics are transported out of cells by P-gp and/or MRP1. Especially CIPN is a relevant side effect to treat/avoid, since CIPN may be a dose limiting side effect of chemotherapy. The invention also relates to kits and to cancer treatment of a subgroup of patients, which subgroup has been topically pretreated with a P-gp inducer and/or MRP1 inducer.

Thus, an object of the present invention relates to the provision of an improved treatment/prevention/lowering of CIPN.

Another object of the present invention relates to the provision of an improved treatment/prevention/lowering of *Alopecia*.

A further object, relates to an improved method for preventing one or more side effects of a chemotherapeutic and/or reducing the risk of getting one or more side effects of a chemotherapeutic and/or reducing the severity of one or more side effects of a chemotherapeutic and/or increasing the tolerability of a chemotherapeutic and/or removing dose limiting side effects of a chemotherapeutic in a subject.

In particular, it is an object of the present invention to provide a treatment/prevention regime that minimizes the risk of developing CIPN or lowers the side effects of CIPN.

An additional object relates to the provision of an improved treatment of cancer.

Another object is to provide a cancer treatment where the dose limit is higher compared to a cancer treatment without the improved treatment (addition of P-gp and/or MRP1 inducer). A dose limit is reached when a side effect of the chemotherapy is serious enough to prevent an increase in dose or level of the treatment.

Thus, one aspect of the invention relates to a composition comprising a P-gp inducer and/or MRP1 inducer, for use in preventing one or more side effects of a chemotherapeutic and/or reducing the risk of getting one or more side effects of a chemotherapeutic and/or reducing the severity of one or more side effects of a chemotherapeutic and/or increasing the tolerability of a chemotherapeutic and/or removing dose limiting side effects of a chemotherapeutic in a subject, wherein, said one or more side effects is caused by a chemotherapeutic, which, in vivo, is transported out of cells by P-gp and/or MRP1; and wherein said P-gp inducer and/or MRP1 inducer is for topical application to the subject.

In a preferred embodiment, the side effect is CIPN.

Another aspect of the present invention relates to a kit of parts comprising
   a first container comprising a chemotherapeutic, which chemotherapeutic, in vivo, is transported out of cells by P-gp and/or MRP1;
   a second container comprising a P-gp inducer and/or MRP1 inducer, preferably formulated for topical application; and
   optionally, instructions for use.

Yet another aspect of the present invention is to provide a composition comprising a chemotherapeutic, which, in vivo, is transported out of cells by P-gp and/or MRP1, for use in the treatment of cancer, wherein said subject has been topically pretreated with a P-gp inducer and/or MRP1 inducer.

Preferably the topical application is at least to the hands and feet in respect of CIPN and at least to the scalp when it comes to *alopecia*.

Still another aspect of the present invention is to provide a method comprising
   a) topically administering one or more P-gp inducers and/or MRP1 inducers to a subject; and
   b) administering to the subject a chemotherapeutic, which, in vivo, is transported out of cells by P-gp and/or MRP1.

In a preferred embodiment the method is for treating cancer. In another preferred embodiment, there is at least 24 hours between administering the P-gp inducers and/or MRP1 inducers and administering the chemotherapeutic.

Figure 1:
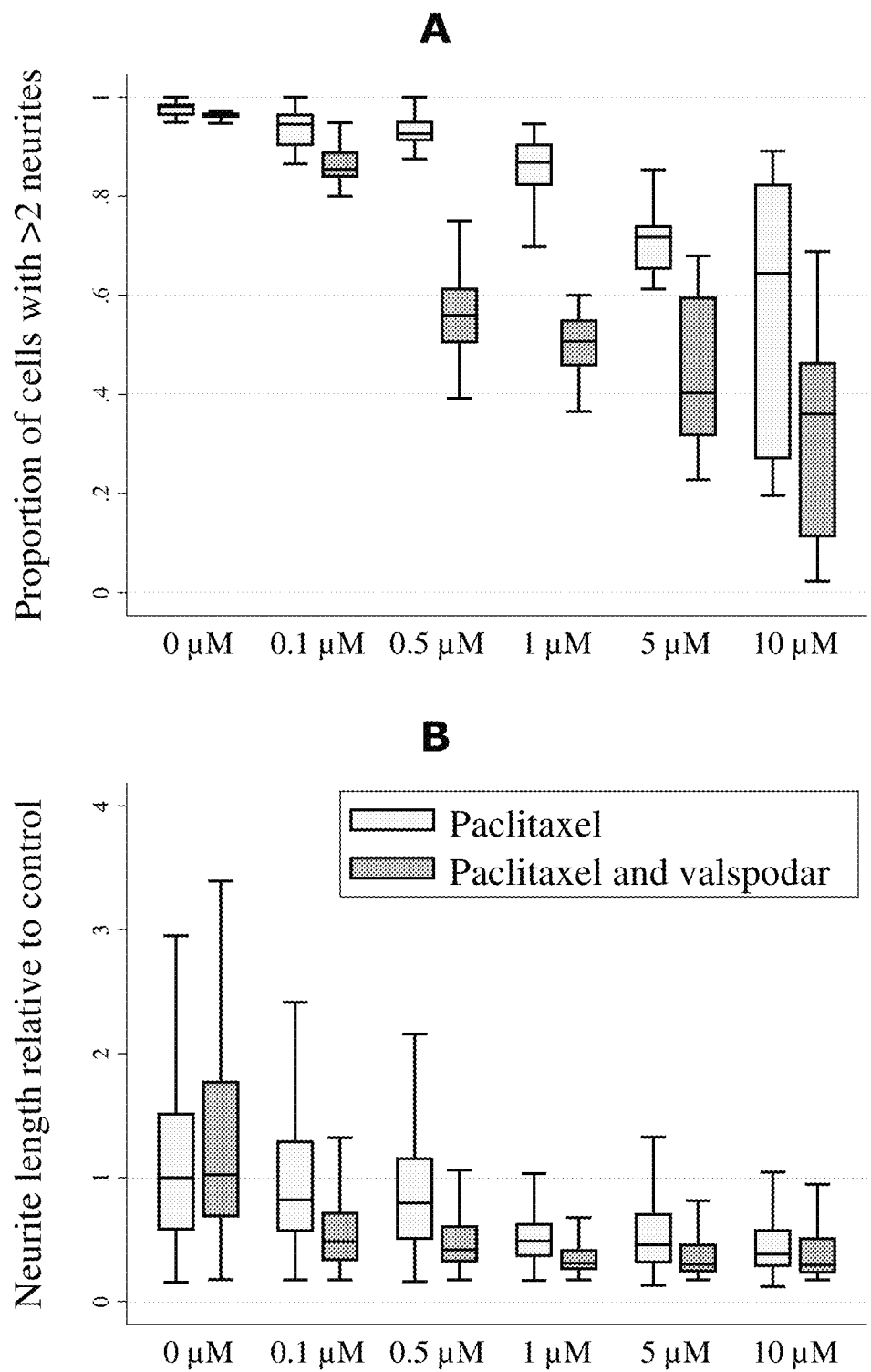
FIG. 1 shows that Paclitaxel reduces the length and number of neurites in SH-SY5Y-derived neurons and this effect is exacerbated by inhibition of P-glycoprotein ($p<0.001$, ANOVA). Fully differentiated SH-SY5Y cells were treated with the indicated concentrations of paclitaxel for 24 hours in the absence and presence of 4 µM valspodar. The cells were stained for β-tubulin and DAPI. The number of cells with more than two neurites (A) and the neurite length (B) were quantified using ImageJ. At least five images from three separate differentiations were assessed. X-axis: Paclitaxel concentration.

The present invention will now be described in more detail in the following.

DETAILED DESCRIPTION OF THE INVENTION

Definitions

Prior to discussing the present invention in further details, the following terms and conventions will first be defined:
Chemotherapy-Induced Peripheral Neuropathy (CIPN)

In the present context, "Chemotherapy-induced peripheral neuropathy" or "CIPN" refers to a progressive and enduring condition featuring pain, numbness, tingling and sensitivity to cold in the hands and feet (sometimes progressing to the arms 30 and legs) that afflicts many patients undergoing chemotherapy.

Chemotherapy-induced peripheral neuropathy (CIPN) is caused by many chemotherapeutic drugs, such as taxanes, *vinca* alkaloids, platins, bortezomib, ixabepilone and thalidomide.
Alocepia The term "*alopecia*" refers to the partial or complete absence of hair from any area of the body where it normally grows. Chemotherapy-induced *alopecia* is most prominent on the scalp. *Alopecia* is a transient usually reversible side effect of many cancer chemotherapy treatments that can be psychologically devastating. The emotional trauma may be so severe as to lead to refusing or delaying treatment that might otherwise be beneficial. Recovery generally requires a period of several months to a year, amplifying the psychological impact of the disease and its treatment.

Several chemotherapeutics are known to induce chemotherapy-induced *alopecia*.
Paclitaxel Paclitaxel is a cytotoxic anticancer drug used in the treatment of solid organ tumors such as breast cancer and ovarian cancer. Paclitaxel is also used in adjuvant and neoadjuvant chemotherapy. While effective, paclitaxel provokes multiple side effects in patients. A common and potentially serious adverse reaction to treatment with paclitaxel is peripheral neuropathy, which occurs in up to 50% of all patients. Clinical signs of paclitaxel-induced peripheral neuropathy (PIPN) include sensory loss, paresthesia, dysesthesia, numbness and tingling and often leads to neuropathic pain. PIPN can be very serious, but even mild to moderate symptoms may persist for several years after treatment cessation, significantly impairing quality of life. With more than 80% of breast cancer patients expected to be long-term survivors, this severe and long-lasting adverse reaction is particularly concerning and of public health interest. Further, treatment success with paclitaxel is correlated to dose and PIPN is the major reason for dose reduction, the development of PIPN may influence survival rates among cancer patients. Paclitaxel belongs to the class of chemotherapeutics named "taxanes" which are known to be transported out of cells by P-gp (Brooks T A, et al. Mol Cancer Ther. 2003 November; 2(11):1195-205).
Bortezomib Bortezomib is used in the treatment of multiple myeloma (MM) and mantle cell lymphoma and is currently being tested in 235 clinical trials globally within indications such as MM, blood cancer and lymphomas.

Bortezomib belongs to the class of chemotherapeutics named "proteasome inhibitors", which are known to be transported out of cells by P-gp (O'Connor R, et al. Cancer Chemother Pharmacol. 2013 May; 71(5):1357-68).
Vincristine Vincristine is used in the treatment of many cancers, including leukemia, non-Hodgkin's lymphoma, thyroid cancer and brain tumors. Vincristine is widely used for treatment of childhood cancers and is currently being tested in 439 clinical trials globally within indications such as blood cancer, central nervous cancer (CNS) and various lymphomas. Vincristine belongs to the class of chemotherapeutics named "*vinca* alkaloids", which are known to be transported out of cells by P-gp (Horio M et al. J Biol Chem. 1989 May 9; 264(25):14880-4).
Ixabepilone Ixabepilone is a microtubule stabilizer, like paclitaxel, used in the treatment of aggressive metastatic or locally advanced breast cancer. Ixabepilone is a substrate for P-gp (Shen H, et al. J Pharmacol Exp Ther. 2011 May; 337(2): 423-32).

P-Glycoprotein (P-Ap)

"P-glycoprotein" or "P-gp" or "Pgp" also known as multidrug resistance protein 1 (MDR1) or ATP-binding cassette sub-family B member 1 (ABCB1) or cluster of differentiation 243 (CD243) is an important protein of the cell membrane that pumps many foreign substances out of cells. It is an ATP-dependent efflux pump with broad substrate specificity. It exists in animals, fungi, and bacteria, and it likely evolved as a defence mechanism against harmful substances.

MRP1

"Multidrug resistance-associated protein 1" or "MRP1" is a protein that in humans is encoded by the ABCC1 gene. MRP1 is a member of the superfamily of ATP-binding cassette (ABC) transporters and is expressed in nearly all membranes in humans. ABC proteins transport various molecules across extra- and intra-cellular membranes. MRP1 is involved in multi-drug resistance.

P-Glycoprotein (P-Ap) Inducer

In the present context, the term "P-glycoprotein (P-gp) inducer" refers to an agent that increases the expression of P-gp or increases the ATP-dependent efflux pump function of P-gp. Examples of P-gp inducers are rifampicin, carbamazepine and dexamethasone. P-gp expression is regulated by pregnane X receptor (PXR) and many inducers of P-gp are PXR agonists.

MRP1 Inducer

In the present context, the term "MRP1 inducer" refers to an agent that increases the expression of MRP1 or increases the transport function of MRP1. Examples of MRP1 inducers are rifampicin, carbamazepine and dexamethasone. MRP1 expression is regulated by pregnane X receptor (PXR) and many inducers of MRP1 are PXR agonists.

Composition Comprising a P-Gp Inducer and/or MRP1 Inducer

As outlined above, it has been found that topically applying a P-gp inducer and/or MRP1 inducer can help protect cells (locally) against damage from chemotherapeutics. Such protection is especially clinically relevant when it comes to CIPN, since it severely affects the health of the patient and may even be a dose limiting factor for the chemotherapeutic. However, local protection may also help in protection against less severe side effects such as hair loss and nail damage. Thus, an aspect of the invention relates to a composition comprising a P-gp inducer and/or MRP1 inducer, for use in preventing one or more side effects of a chemotherapeutic and/or reducing the risk of getting one or more side effects of a chemotherapeutic and/or reducing the severity of one or more side effects of a chemotherapeutic and/or increasing the tolerability of a chemotherapeutic and/or removing dose limiting side effects of a chemotherapeutic in a subject, wherein, said one or more side effects is caused by a chemotherapeutic, which, in vivo, is transported out of cells by P-gp and/or MRP1.

As outlined in the example section (see examples 4 and 6), the addition of a P-gp/MRP1 inducer prevents damage of the cells. This can e.g. be explored to protect e.g. against CIPN. Preferably, the inducer is applied topically to the skin, thus in an embodiment, said P-gp inducer and/or MRP1 inducer is prepared for topical application to the subject. In the present context "topical administration" means application to body surfaces such as the skin, scalp and nail roots. In an embodiment, the composition is in the form of creams, foams, gels, lotions, and ointments. In another embodiment, the topical application is epicutaneous, meaning that it is applied directly to the skin.

Thus, in an embodiment, said one or more side effects is selected from the group consisting of CIPN, hair loss (*Alopecia*), and nail damage, such damage to the root of nails. CIPN is described in the example section, where the presence of P-gp in sensory neurons has been identified. It has been realized that this effect can be extrapolated to chemotherapy induced *alopecia* and nail root damage, which is often the consequence of chemotherapy.

In an embodiment, said P-gp inducer and/or MRP1 inducer is for topical application to the subject, preferably at least to the hands and/or feet and/or arms and/or legs, preferably at least to the hands and feet. CIPN is most often located to the hands and feet, but may also locate to arms and legs. Thus, these are the most relevant areas of the body to protect using topical application of the inducer. In the case of nail damage, the areas around the nails should be protected.

In an embodiment, the composition is for preventing CIPN and/or reducing the risk of developing CIPN and/or reducing the severity of CIPN in a subject.

The composition comprising the P-gp inducer and/or MRP1 inducer may be further improved to reach the correct location under the skin. Thus, in an embodiment, the composition further comprising one or more enhancers that enhances that the P-gp inducer and/or MRP1 inducer reaches the dermis of the cells. In an embodiment, enhancers are selected from the group consisting of ethanol, acetone, glycols (e.g. polypropylene glycol), phosphatidylcholine and sodium lauryl sulphate. These enhancers may enhance that the P-gp and/or MRP1 inducer reaches the dermis of the cells. These enhancers are non-limiting examples. Also, encapsulating the P-gp and/or MRP1 inducer, such as in liposomes, niosomes, emulsifiers, solid lipid nanoparticles or nanostructured lipid carriers may enhance reaching the dermis of the cells. Thus, in an embodiment, the P-gp and/or MRP1 inducer are encapsulated such as in liposomes, niosomes, emulsifiers, solid lipid nanoparticles and nanostructured lipid carriers.

In an embodiment, the composition comprises a pharmaceutically acceptable carrier, In one embodiment, the pharmaceutically acceptable carrier in the composition is a pharmaceutically acceptable carrier for topical use.

In one embodiment, the pharmaceutically acceptable carrier for topical use in the composition is a pharmaceutically acceptable carrier for topical use on the skin.

Thus, in an embodiment, the composition further comprises one or more enhancers that enhances that the P-gp inducer and/or MRP1 inducer reaches the dermis of the cells.

In another embodiment, said P-gp inducer and/or MRP1 inducer is prepared for topical application to the subject, preferably at least to the scalp, eyebrows and/or eye lashes. *Alopecia* relates to hair loss, thus, for protection against hair loss regions with hair should be protected, such as hair on the head (such as to the scalp), the eye brows and eye lashes. Albeit protection against hair loss is at first glance of less clinical importance compared to CIPN, it is still damage to the cells and may be psychologically devastating to the patient. The emotional trauma may be so severe as to lead to refusing or delaying treatment that might otherwise be beneficial.

The inducers may work e.g. through inducing transporter activity or increasing expression. Thus, in an embodiment, the P-gp and/or MRP1 inducer, induces increased expression and/or increased activity of P-gp and/or MRP1, preferably induces increased expression. P-gp and MRP1 are regulated by pregnane X receptor (PXR). Thus, agonists of PXR, such as rifampicin and carbamazepine will increase expression and thus activity of both efflux transporters.

The addition of inducers is only clinically relevant if the later used chemotherapeutics are transported out of the cells by P-gp and/or MRP1. Thus, in a further embodiment, the chemotherapeutic is selected from the group consisting of taxanes, *vinca* alkaloids, epothilones, anthracyclines, proteasome inhibitors, altretamine and topoisomerase inhibitors. These are all chemotherapeutics, which are transported out of cells by P-gp and/or MRP1. Examples 5 and 8 show that the method of the invention works for a taxane (paclitaxel) and for a *vinca* alkaloid (vincristine).

In a further embodiment, the chemotherapeutic is selected from

Taxanes, such as docetaxel and/or paclitaxel;

*Vinca* alkaloids, such as Vincristine and/or vinorelbine;

Epothilones, such as ixabepilone;

Antracyclines, such as doxorubicin, daunorubicin, epirubicin, and/or idarubicin;

Topoisomerase inhibitors, such as etoposide, irinotecan and/or topotecan;

Proteasome inhibitors, such as Bortezomib; and

Altretamine.

In yet an embodiment, the chemotherapeutic is selected from Docetaxel, paclitaxel, Vincristine, vinorelbine, Ixabepilone, Doxorubicin, daunorubicin, epirubicin, idarubicin, Etoposide, irinotecan, topotecan and Altretamine; with the proviso that the composition is for preventing *alopecia* and/or reducing the risk of developing *alopecia* and/or reducing the severity of *alopecia* in a subject. These chemotherapeutics are all known to induce chemotherapy induced *alopecia*.

In yet a further embodiment, the chemotherapeutic is selected from Docetaxel, paclitaxel, Vincristine, Ixabepilone, and Bortezomib; with the proviso that the composition is for preventing CIPN and/or reducing the risk of developing CIPN and/or reducing the severity of CIPN in a subject. These chemotherapeutics are all known to induce CIPN.

In yet a further embodiment, the chemotherapeutic is selected from Paclitaxel, docetaxel and doxorubicin. These chemotherapeutics are all known to induce nail damage (nail root damage).

Different compounds are known to function as inducers of P-gp and/or MRP1. Thus, in an embodiment, said P-gp inducer and/or MRP1 inducer is selected from the group consisting of rifampicin, carbamazepine and dexamethasone. In e.g. examples 5 and 8 the P-gp/MRP1 inducer rifampicin has been tested for different types of chemotherapeutics.

In another embodiment, said P-gp inducer is selected from the group consisting of carbamazepine, dexamethasone, doxorubicin, nefazodone, phenobarbital, phenytoin, prazosin, rifampicin, St. John's wort, tenofovir, tipranavir, trazodone, and vinblastine. This list of compounds includes common known pharmacological inducers of P-glycoprotein.

In yet another embodiment, said subject is scheduled for treatment with a chemotherapeutic selected from the group consisting of taxanes, *vinca* alkaloids, epothilones, antracyclines, proteasome inhibitors, altretamine and topoisomerase inhibitors.

In a more specific embodiment relating to the composition for use,
the P-gp inducer and/or MRP1 inducer is rifampicin,
the chemotherapeutic is paclitaxel,
and the use is for preventing CIPN and/or reducing the risk of getting CIPN and/or reducing the severity of CIPN and/or increasing the tolerability of CIPN and/or removing CIPN as the dose limiting side effect of paclitaxel in a subject; and
wherein rifampicin is formulated for topical application, preferably to the hands and feet.

Example 5 shows the effect of rifampicin pretreatment in relation to paclitaxel treatment.

In another more specific embodiment relating to the composition for use,
the P-gp inducer and/or MRP1 inducer is rifampicin,
the chemotherapeutic is vincristine,
and the use is for preventing CIPN and/or reducing the risk of getting CIPN and/or reducing the severity of CIPN and/or increasing the tolerability of vincristine and/or removing CIPN as the dose limiting side effect of vincristine in a subject; and
wherein rifampicin is formulated for topical application, preferably to the hands and feet. Example 8 shows the effect of rifampicin pretreatment in relation to vincristine treatment.

In yet another more specific embodiment relating to the composition for use,
the P-gp inducer and/or MRP1 inducer is rifampicin,
the chemotherapeutic is paclitaxel or vincristine,
and the use is for preventing *alopecia* and/or reducing the risk of getting *alopecia* and/or reducing the severity of *alopecia* and/or increasing the tolerability of paclitaxel and vincristine and/or removing *alopecia* as the dose limiting side effect of paclitaxel and/or vincristine in a subject; and
wherein rifampicin is formulated for topical application, preferably at least to the scalp, eyebrows and/or eye lashes.

It is believed that there should be a certain period of time between (topically) applying the P-gp and/or MRP1 inducer and the chemotherapeutic. Thus, in embodiment, the P-gp and/or MRP1 inducer is prepared to be administered to the subject before administering the chemotherapeutic to the subject, such as prepared to be administered more than 1 day before administering the chemotherapeutic to the subject, such as more than 3 days, such as 1-7 days. The period may vary, thus (without being bound by theory) by having e.g. at least 1 day (24 hours) between administration of the two compositions, there is time for the inducer to reach the cells, activate P-gp and/or MRP1, and be cleared from the body.

In an embodiment, the subject is a mammal, preferably a human, and more preferably a human suffering from cancer.

In an embodiment, the cancer is a solid organ tumor cancer such as breast cancer and ovarian cancer. Paclitaxel (a taxane) and epothilones is used for treatment of such cancers.

In another embodiment, the cancer is selected from the group consisting of blood cancer, multiple myeloma (MM), mantle cell lymphoma, and lymphomas. Bortezomib (a proteasome inhibitor) is used for treatment of such cancers.

In yet another embodiment, the cancer is selected from the group consisting of leukemia, non-Hodgkin's lymphoma, thyroid cancer, children's leukemia and brain tumors. Vincristine (a *vinca* alkaloid) is used for treatment of such cancers.

In an embodiment, the cancer is not skin cancer on the hands and/or feet. In another embodiment, the cancer is not Peripheral Nervous System (PNS) Cancer. It is to be understood that the cancer is not a cancer which primarily is located where the inducer is applied.

Kit

Since the present invention may involve both a P-gp and/or MRP1 inducer and a chemotherapeutic able to be transported by these efflux pumps, it could be relevant to have a kit comprising these components. Thus, an aspect of the invention relates to a kit of parts comprising
a first container comprising a chemotherapeutic, which chemotherapeutic, in vivo, is transported out of cells by P-gp and/or MRP1;
a second container comprising a P-gp inducer and/or MRP1 inducer, preferably formulated for topical application; and
optionally, instructions for use.

The instructions may comprise instructions in relation to how and where to administer the compounds, concentrations and/or time between administering the components.

In an aspect, the invention also relates to the kit of parts according to the invention, for use as a medicament. As outlined above, the kit may be relevant in relation to side effects of chemotherapy such as CIPN, hair loss (*Alopecia*), and nail damage, such damage to the root of nails.

In another aspect, the kit of parts according to the invention is for use in the treatment or alleviation of a cancer in a subject. Albeit the invention relates to avoiding side effects of certain chemotherapies, the overall goal is treatment/ alleviation of cancer. Thus, in an embodiment the invention relates to an improved treatment, namely fewer side effects. It could also allow the clinician to use higher concentrations of the chemotherapeutic thereby improving cancer treatment, while have the same amount of side effects as compared to treatment without the use of the inducer.

Thus, in an embodiment, the kit of parts is for use in preventing one or more side effects of chemotherapy and/or reducing the risk of getting one or more side effects of chemotherapy and/or reducing the severity of one or more side effects of chemotherapy, and/or increasing the tolerability of chemotherapy and/or removing dose limiting side effects of chemotherapy, in a subject, wherein said one or more side effects is caused by a chemotherapeutic, which chemotherapeutic, in vivo, is transported out of cells by P-gp and/or MRP1.

In yet an embodiment, said one or more side effects is selected from the group consisting of CIPN, hair loss (*Alopecia*), and nail damage, such as damage to the root of nails.

In yet another embodiment, said subject is considered at risk of developing CIPN, hair loss and/or nail damage.

As outlined above, the inducers are considered to be topically applied, preferably to the skin. Thus, in an embodiment, said P-gp inducer and/or MRP1 inducer is prepared to be topically applied to the subject, preferably at least to the hands and/or feet and/or arms and/or legs, preferably at least to the hands and feet. These areas are particular relevant in relation to CIPN and nail damage.

In a related embodiment, said P-gp inducer and/or MRP1 inducer is prepared to be topically applied to the subject, preferably at least to the scalp, eyebrows and/or eye lashes. These areas are particular relevant in relation to hair loss.

The chemotherapeutic may be administered by any standard route for the specific drug. Thus, in an embodiment, the chemotherapeutic is prepared to be administered by a route selected from the group consisting of orally, intravenously, subcutaneous, intramuscular, intrathecal, and intraventricular.

A Composition Comprising a Chemotherapeutic

The teaching of the present invention also allows for using known chemotherapeutics to treat a novel subgroup of patients. Thus, an aspect of the invention relates to a composition comprising a chemotherapeutic, which, in vivo, is transported out of cells by P-gp and/or MRP1, for use in the treatment of cancer, wherein said subject has (previously) been topically pretreated with a P-gp inducer and/or MRP1 inducer. Topical treatment is described in further details for the other aspects of the invention. Thus, in an embodiment, the pretreatment is topical treatment at least to the hands and feet with the P-gp inducer and/or MRP1 inducer.

In another embodiment, the pretreatment is topical treatment at least to the scalp with the P-gp inducer and/or MRP1 inducer.

In a preferred embodiment, there is at least 24 hours between administering the P-gp inducers and/or MRP1 inducers and administering the chemotherapeutic.

In an embodiment, the chemotherapeutic is selected from the group consisting of taxanes, *vinca* alkaloids, epothilones, anthracyclines, proteasome inhibitors, altretamine and topoisomerase inhibitors. These are chemotherapeutics, which, in vivo, are transported out of cells by P-gp and/or MRP1.

In yet an embodiment, the pretreatment with the P-gp inducer and/or MRP1 inducer is for preventing one or more side effects of the chemotherapeutic and/or reducing the risk of getting one or more side effects of the chemotherapeutic and/or reducing the severity of one or more side effects of the chemotherapeutic and/or increasing the tolerability of the chemotherapeutic and/or removing dose limiting side effects of the chemotherapeutic in the subject.

In a further embodiment, said one or more side effects is selected from the group consisting of CIPN, hair loss (*Alopecia*), and nail damage, such damage to the root of nails.

The composition may be administered to different location on the body, depending on which side effect it to be avoided/minimized during the chemotherapy treatment. Thus, in an embodiment, the pretreatment with a P-gp inducer and/or MRP1 inducer is topical treatment such as on the hands and/or feet and/or arms and/or legs, preferably at least to the hands and feet (relevant especially for CIPN and nail damage);

and/or topical treatment, preferably at least to the scalp, eyebrows and/or eye lashes (*Alopecia*).

As outlined above, different P-gp inducers and/or MRP1 inducers exist. Thus, in an embodiment, the P-gp inducer and/or MRP1 inducer is selected from the group consisting of rifampicin, carbamazepine and dexamethasone.

It is considered important that a certain period of time is placed between the pre-treatment the administration of the chemotherapeutic. The period may vary, thus (without being bound by theory) by having e.g. at least 1 day (24 hours) between administration of the two compositions, there is time for the inducer to reach the cells, activate P-gp and/or MRP1, and be cleared from the body.

Other Aspects

In yet an additional aspect the invention relates to a method comprising a) topically administering one or more P-gp inducers and/or MRP1 inducers to a subject; and b) administering to the subject a chemotherapeutic, which, in vivo, is transported out of cells by P-gp and/or MRP1.

In an embodiment, the method is for treating cancer.

In another embodiment, the method is for preventing one or more side effects of the chemotherapeutic and/or reducing the risk of getting one or more side effects of the chemotherapeutic and/or reducing the severity of one or more side effects of the chemotherapeutic and/or increasing the tolerability of the chemotherapeutic and/or removing dose limiting side effects of the chemotherapeutic in the subject, In yet another embodiment, said one or more side effects is selected from the group consisting of CIPN, hair loss (*Alopecia*), and nail damage, such damage to the root of nails.

It should be noted that embodiments and features described in the context of one of the aspects of the present invention also apply to the other aspects of the invention.

All patent and non-patent references cited in the present application, are hereby incorporated by reference in their entirety.

The invention will now be described in further details in the following non-limiting examples.

EXAMPLES

Example 1—Paclitaxel Affects Neuronal Morphology

Aim of Study

To evaluate how Paclitaxel affects neuronal morphology.

Materials and Methods

Cell Culture

SH-SY5Y cells (94030304, Sigma-Aldrich) were kept in DMEM/F:12 (11320074, ThermoFisher) with 15% heat-inactivated fetal bovine serum (hiFBS, F9665 Sigma-Aldrich), 1% penicillin/streptomycin (p/s) and 2 mM glutamine. Cells were split 1:10-1:20 using 0.05% trypsin-EDTA (10779413, Fisher Scientific) at 70-80% confluence. At high passage number, the epithelial cell type takes over the culture and causes drastically reduced efficiency of the differentiation. Thus, cells were only used below passage 15.

Reagents and Antibodies

Paclitaxel (T7402, Sigma-Aldrich) was diluted serially in DMSO (D2650, Sigma-Aldrich) and these stock solutions diluted 1:500 to ensure 0.2% DMSO in all samples. These concentrations were selected based on the clinical pharmacokinetic profile of paclitaxel. Valspodar (SML0572, Sigma-Aldrich) were used at a final concentration of 4 µM. Antibody against TUBB3 (MA1-118, ThermoFisher Scientific) was used at 1:1000. Human dorsal root ganglion RNA for qPCR analysis was purchased from Clontech Laboratories (636150, Clontech laboratories, Inc, Mountain View, California, USA). Human dorsal root ganglion for protein quantification of ABCB1 was obtained from National Disease Research Interchange (Philadelphia, PA, USA).

Differentiation of SH-SY5Y Cells

SH-SY5Y cells were differentiated as previously described in detail by Shipley et al. (JoVE J Vis Exp. 2016 Feb. 17; (108):e53193-e53193). Briefly, SH-SY5Y cells below passage 15 were seeded at $5\text{-}6 \times 10^3$ cells/cm$^2$ in uncoated 6-well plates (day 0 (D0)) and left overnight in growth media. The next day (D1) differentiation was initiated using DMEM/F:12 media with 2.5% hiFBS, 1% p/s, 2 mM glutamine and 10 µM retinoic acid (RA, R2625 Sigma-Aldrich) and media was replaced at D3 and D5. On D7 cells were split 1:1 using 0.05% trypsin-EDTA to uncoated dishes and on D8 hiFBS content was reduced to 1%. On D10 the cells were split 1:1 to extracellular matrix-coated dishes (E0282, Sigma-Aldrich). On D11 media was replaced with the final differentiation media containing neurobasal media (21103049, ThermoFisher) with 1×B27 supplement (17504044, ThermoFisher), 20 mM KCl (10697623, Fisher Scientific), 1% p/s, 1× Glutamax, 50 ng/ml brain-derived neurotrophic factor (BDNF, CST-3897S, Peprotech), 2 mM dibutyryl cyclic AMP (db-cAMP, D0627 Sigma-Aldrich) and 10 µM RA. Media was replaced on D14 and D17 and cells were tested and confirmed as fully differentiated on D18 and used for downstream applications as outlined below.

Real Time Quantitative Polymerase Chain Reaction (RT-qPCR)

Total RNA from SH-SY5Y cell lines was isolated using an RNeasy Mini kit (Qiagen, Valencia, CA). Total RNA (1 µg) was reverse transcribed into cDNA using a SuperScript VILO cDNA Synthesis kit (Life Technologies, CA). Quantitative real-time PCR was carried out in 384-well reaction plates using 2× Taqman Fast Universal Master Mix (Applied Biosystems, Foster City, CA), 20× Taqman specific gene expression probes for each transporter, and 10 ng of the cDNA template. The reactions were carried out on an Applied Biosystems 7900HT Fast Real-Time PCR System (Applied Biosystems, Foster City, CA). The relative expression level of each mRNA transcript was calculated by the comparative method (ΔCt method), normalized to the housekeeping gene, hypoxanthine phosphoribosyl transferase (HPRT).

Immunolabelling

Both differentiated and undifferentiated SH-SY5Y cells were fixed using 4% paraformaldehyde. Cells were permeabilized using 0.25% Triton X-100 and unspecific binding was blocked using bovine serum albumin (BSA). Primary antibodies were incubated overnight at 4° C. and secondary antibodies were incubated for one hour at room temperature. Nuclei were stained using 1.5 µM DAPI for 5 minutes. Imaging was performed using a Leica DMI4000B microscope. Neurite morphology was assessed using the ImageJ modules CellCounter and Simple Neurite Tracer. To determine number of neurites per cell, CellCounter was used to count the number of cells with 0, 1, 2 . . . n neurites. Neurite length was determined using Simple Neurite Tracer. For both endpoints, at least five images of each condition from three separate differentiations were used. ImageJ analysis was blinded to the person assessing length and number of neurites to ensure no bias.

LC-MS/MS method to determine intracellular paclitaxel concentrations Fully differentiated SH-SY5Y cells were exposed to 1-10 µM paclitaxel for 1 hour with and without 1 hour pre-incubation with efflux transporter inhibitors. After this, media was aspirated and cells were lysed using radio immunoprecipitation assay (RIPA) buffer with 4% protease inhibitor for 10 minutes on ice. Cells were collected using a cell scraper, vortexed and sonicated (1 sec×2), centrifuged and the supernatant was stored at −80° C. until LC-MS/MS analysis. The concentration of paclitaxel in the cell lysate was determined at the Department of Clinical Pharmacology and Pharmacy, Institute of Public Health, University of Southern Denmark by use of liquid chromatography and tandem mass spectrometry (LC-MS/MS). The LC-MS/MS system consisted of an Ultimate 3000 UHPLC system connected to a TSQ Quantiva Triple Quadropole Mass Spectrometer with heated electrospray ionization (H-ESI) (Thermo Scientific, San Jose, CA). The ionization was performed in positive mode with a spray voltage of 3000 V, sheath gas 40 (AU), aux gas 9 (AU), sweep gas 1 (AU) and a vaporizer temperature of 400° C. The ion transfer tube temperature was 350° C. Data acquisition was performed in single reaction monitoring (SRM) mode. Paclitaxel was quantified at the transition from (m/z) 876.18-308.00, and with (m/z) 876.18-591.11 and (m/z) 876.19-531.11 as qualifier traces. The analytical separation was performed by use of a Hypersil GOLD (C18) 50×2.1 mm (1.9 µm) column (Thermo Scientific, San Jose, CA) with a mobile phase of acetonitrile: 0.1 M formic acid (40:60 v/v) at a flow rate of 0.4 mL/min. The sample preparation of the cell lysate consisted of a single dilution step. A volume of 100 µL cell lysate and 100 µL acetonitrile was pipetted into a 1.5 mL polypropylene micro tube (Sarsted, Nürnbrecht, Germany). The sample was vortex mixed for 5 min, and thereafter centrifuged at 15,000 g for 15 min. A volume of 10 µL of the supernatant was injected onto the LC-MS/MS system. Calibration curves ranging from 25 nM to 3000 nM as well as quality control samples were prepared and included in each batch of analysis. The intra- and interday variability was <8%. The limit of detection (LOD) for the method was 1 ng/mL and limit of quantification (LOQ) was 10 ng/mL. Finally, paclitaxel concentrations were adjusted for protein concentration in each well as assessed using a Pierce BCA protein assay kit.

LC-MS/MS to Determine Transporter Expression

Transporter protein expression levels were analyzed by TXP targeted proteomic analysis, which has been described before. In short, cell pellets were incubated for one hour with lysis buffer containing 1% NP-40 (Thermo Fisher), 0.01% SDS (ThermoFisher), 0.15M NaCl (Merck), 0.01M di-Sodium hydrogen phosphate dihydrate (Merck), 2 mM EDTA, and 2.5 units/mL Benzonase (Novagen). The protein concentration in the lysate was determined by BCA assay (Thermo Fisher Scientific) according to the manufacturer's manual. Subsequently, 70 µg protein was proteolyzed with trypsin overnight. Stable isotope labelled peptides and TXP-antibodies (customized produced by Pineda) were added to 20 or 40 µg of the digest and incubated for one hour. Peptide-antibody complexes were precipitated, washed and denatured by using protein G-coated magnetic beads (ThermoFisher) and a magnetic particle processor (KingFisher 96, ThermoFisher). The precipitated peptides were subsequently quantified using the previously described 10 min LC-MS method (UltiMate 3000 RSLCnano and tSIM—QExactive Plus™ Thermo Scientific, Waltham, USA) (Weiss F et al. Drug Metab Dispos. 2018 Jan. 18). LC gradients were optimized for each multiplex. Raw data were processed with Skyline v4.1. Peak areas of isotopically-labeled peptides representing known peptide amounts and endogenous signals were set in relation to one another on parent ion level.

Statistics

Analysis of variance (ANOVA) was used to assess dose-dependent effects of paclitaxel on number and length of neurites and intracellular accumulation of paclitaxel. Data were log-transformed to ensure normality of data. STATA software version 15 was used to perform the statistical analysis. The logistic regression to assess risk of dose modification of paclitaxel due to P-gp inhibitors was adjusted for age, body surface, tumor type, cancer stage, treatment schedule and previous chemotherapy. SPSS software version 19 was used to perform the logistic regression analysis.

Results

SH-SY5Y cells were effectively differentiated to neurons using the protocol of Shipley et al. (JoVE J Vis Exp. 2016 Feb. 17; (108):e53193-e53193). After 18 days of differentiation the cells form a complex neuronal network with high TUBB3 expression and the majority of cells (>97.5%) were negative for the proliferation marker Ki67, indicating that the cells are post-mitotic (data not shown).

Figure 2:
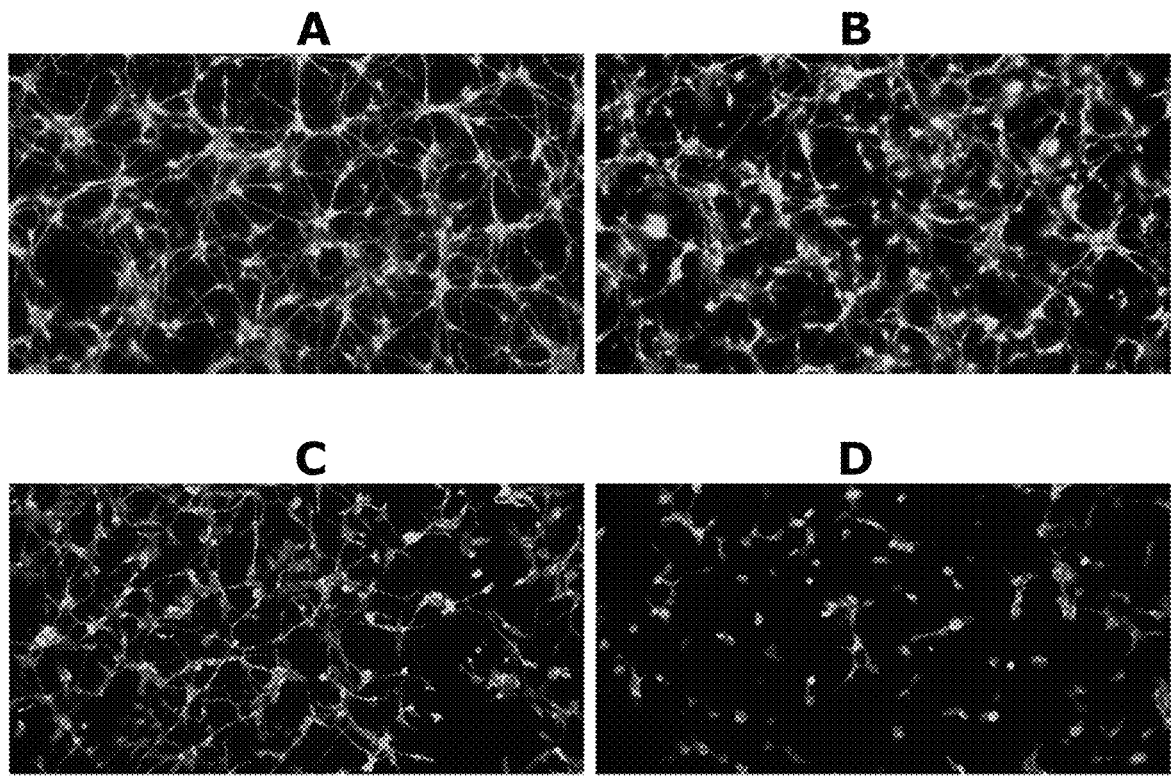
FIG. 2 shows inhibition of P-glycoprotein enhances paclitaxel-induced neurite damage. Fully differentiated SH-SY5Y cells were treated for 24 hours with 0.2% DMSO (A), 4 µM valspodar (B), 0.5 µM paclitaxel in the absence (C) and presence of 4 µM valspodar (D). The cells were stained for β-tubulin and DAPI and representative images are shown. Exposure to low concentrations of paclitaxel causes minimal effects on neuronal networks compared to the 0.2% DMSO control, but concomitant treatment with 4 µM of the P-gp inhibitor valspodar causes increased neuronal toxicity of paclitaxel.

Neuronal morphology was assessed by measuring neurite length and the number of neurites/cell in fully differentiated SH-SY5Y cells with 24 hours paclitaxel treatment. Paclitaxel induced a dose-dependent neurotoxicity to differentiated SH-SY5Y cells and significantly reduced both the number of neurites ($p<0.001$) and their length ($p<0.001$) (FIG. 1).

mRNA and protein expression of relevant drug transporters were assessed by qPCR and LC-MS/MS and indicated expression of the efflux transporters P-gp and MRP1 in both SH-SY5Y cells and human dorsal root ganglion (data now shown). To assess the role of P-gp on the neuronal accumulation and neurotoxicity of paclitaxel, P-gp was inhibited with 4 µM valspodar. Inhibiting P-gp with valspodar substantially exacerbated the neuronal toxicity of paclitaxel as indicated by a decrease in the number and length of neurites (ANOVA $p<0.001$, FIGS. 1 and 2). Valspodar did not affect the neuronal morphology without paclitaxel present (FIG. 2).

Conclusion

Inhibiting P-gp increased the neuronal toxicity of paclitaxel in SH-SY5Y neuron cells. These data also suggests that stimulating P-gp would have the opposite effect and thus also that CIPN could be prevented by applying such P-gp inducers to the skin.

Example 2—Intracellular Concentrations of Paclitaxel

Aim of Study

To confirm that the increased harmful effect of paclitaxel on neuronal morphology under conditions of P-gp inhibition is related to increased exposure, the intracellular concentrations of paclitaxel were quantified.

Materials and Methods

Cells were treated with paclitaxel with and without concomitant P-gp inhibition by valspodar and intracellular levels were measured 1 hour after treatment.

For further details, see also materials and methods section in example 1.

Results

Figure 3:
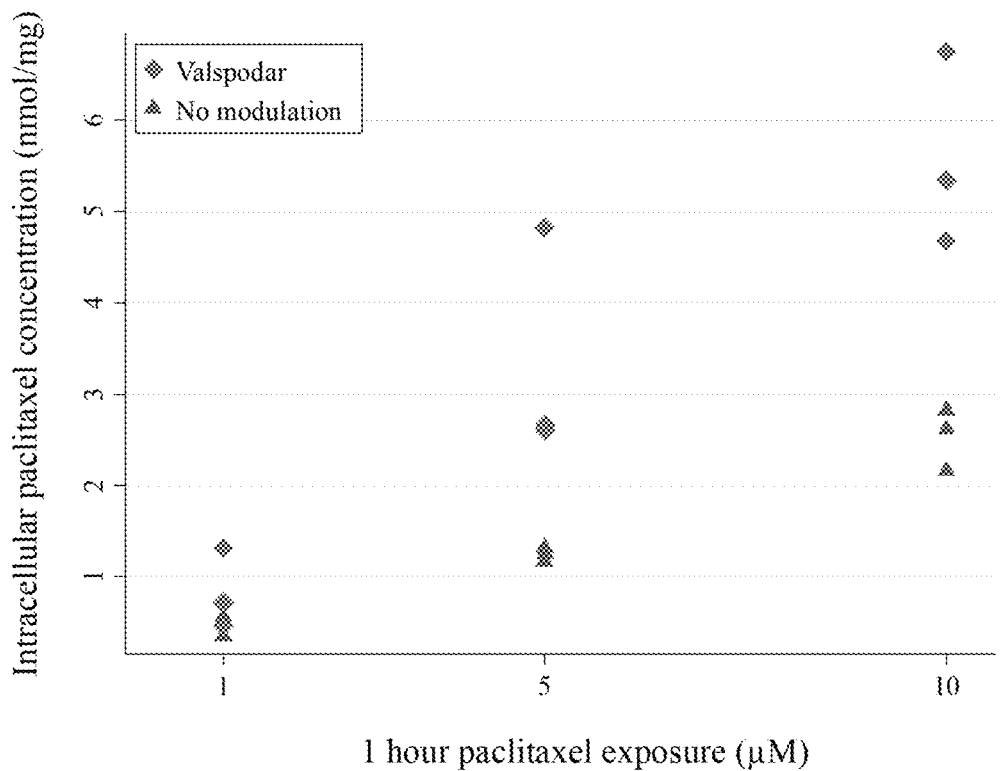
FIG. 3 shows P-gp inhibition causes increased accumulation of paclitaxel in SH-SY5Y-derived neurons (A) and induction causes reduced accumulation of paclitaxel in sensory neurons derived from induced pluripotent stem cells (iPSC) (B). Fully differentiated SH-SY5Y cells or iPSC-derived sensory neurons were treated with the indicated concentrations of paclitaxel for 1 hour in the absence and presence of 4 µM valspodar or 48 hours pretreatment with rifampicin. The values shown are triplicates from one differentiation.
Figure 3:
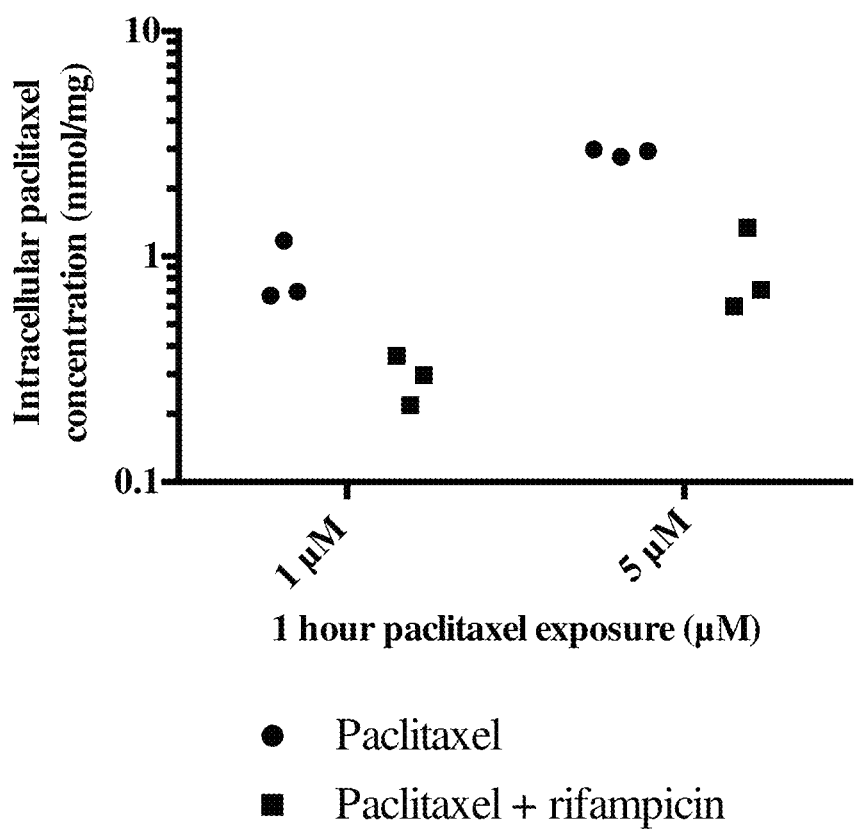

Inhibition of P-gp caused a >3-fold increase in intracellular accumulation of paclitaxel at 10 µM ($p<0.001$, FIG. 3).

Conclusion

P-gp inhibition causes increased accumulation of paclitaxel in SH-SY5Y-derived neurons. Again, these data suggest that stimulating P-gp would have the opposite effect and thus also that CIPN could be prevented by applying such P-gp inducers to the skin.

Example 3—P-Gp Inhibitors and Paclitaxel-Induced Peripheral Neuropathy in Patients Aim of Study To assess if concomitant ingestion of P-gp inhibitors causes increased risk of peripheral neuropathy among patients treated with paclitaxel.

Materials and Methods

P-Gp Inhibitors and Paclitaxel-Induced Peripheral Neuropathy in Patients

To assess if P-gp inhibition leads to increased risk of peripheral neuropathy we used a previously described database of 503 paclitaxel treated patients with breast or ovarian cancer (Sanchez-Barroso L et al. The Oncologist. 2018 Nov. 23). Briefly, dose-modifications due to peripheral neuropathy were collected from medical records and multivariate logistic regression was performed to assess if users of P-gp inhibitors had a higher risk of dose modifications due to neuropathy. P-gp inhibitors were selected based on two literature reviews (see comments under table 1). From these reviews, we identified drugs listed as P-gp inhibitors (drugs classified as inhibitor in either review), and, within these, strong P-gp inhibitors (drugs classified as inhibitor in both reviews).

The association from univariate and multivariate analysis between paclitaxel dose modification due to peripheral neuropathy and concomitant P-gp inhibitor use is shown in Table 1.

Results

Patients treated with any P-gp inhibitor had a 2.4-fold (95% confidence interval (CI): 1.3-4.3) increased risk of dose modification due to peripheral neuropathy, patients treated with strong inhibitors led to 4.7-fold (95% CI: 1.9-11.9) higher risk and patients treated with atorvastatin had 7.0-fold (95% CI: 2.3-21.5) increased risk, while users of simvastatin was not at increased risk.

TABLE 1

Paclitaxel-treated patients using P-gp inhibitors have a higher risk of dose modification due to peripheral neuropathy.

| P-gp inhibitors [a] | n | Univariate analysis Odds-ratio (95% confidence interval) | Multivariate analysis [b] Odds-ratio (95% confidence interval) |
|---|---|---|---|
| Any inhibitor | 117 | 2.55 (1.51-4.31) | 2.36 (1.31-4.25) |
| Strong inhibitor | 24 | 5.73 (2.46-13.36) | 4.73 (1.88-11.90) |
| Atorvastatin | 16 | 9.41 (3.30-26.82) | 7.01 (2.28-21.53) |
| Simvastatin | 22 | 0.60 (0.18-2.05) | 0.31 (0.09-1.13) |

[a] Drugs listed as P-gp inhibitors by Wassler et al. (J Am Coll Cardiol. Jun. 25 2013; 61(25):2495-502) or Lund et al. (Drugs. May 2017; 77(8):859-83).
[b] Adjusted for age, body surface, tumor type, cancer stage, treatment schedule and previous chemotherapy.

Conclusion

These data clearly indicates that systemically administered P-gp inhibitors increase the risk of CIPN in patients treated with paclitaxel. Again, these data suggest that stimulating P-gp would have the opposite effect and that CIPN could be prevented by applying such P-gp inducers to the skin.

Example 4—Induction of P-Gp with Rifampicin Protects Neurons from Paclitaxel-Induced Neuronal Toxicity Aim of Study To verify that induction of P-gp with rifampicin protects neurons from paclitaxel induced peripheral neuropathy.

Materials and Methods

Cells were pretreated for 48 hours with 25 µM rifampicin prior to addition of paclitaxel treatment.
See also example 5.

Results

Figure 4:
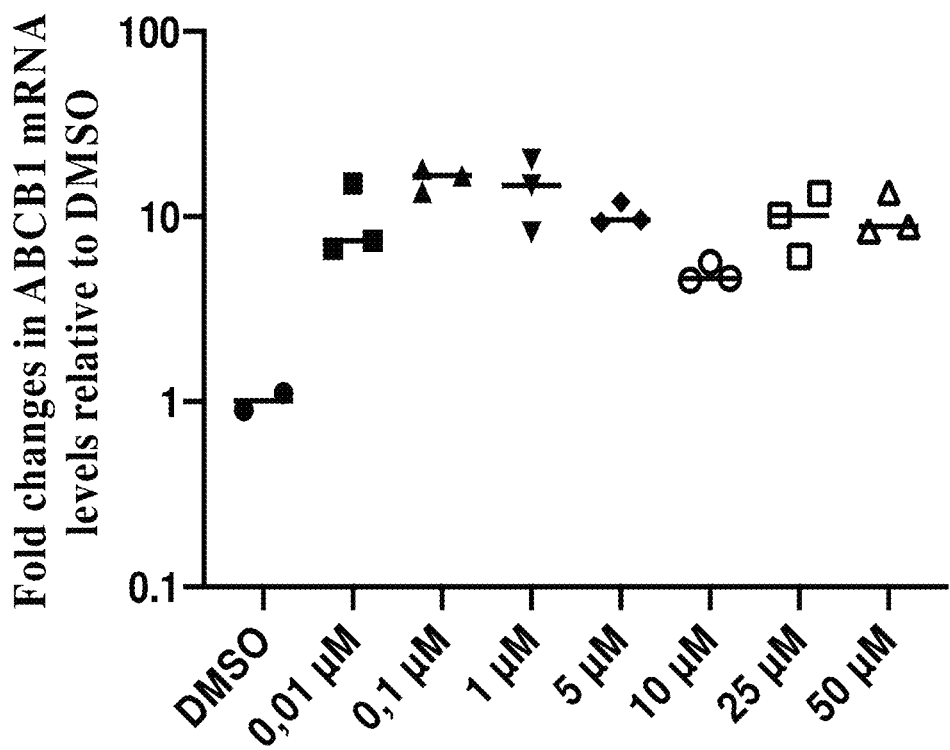
FIG. 4 shows that 48 hours treatment with rifampicin leads to increased expression of P-gp in sensory neurons derived from induced pluripotent stem cells.
Figure 5:
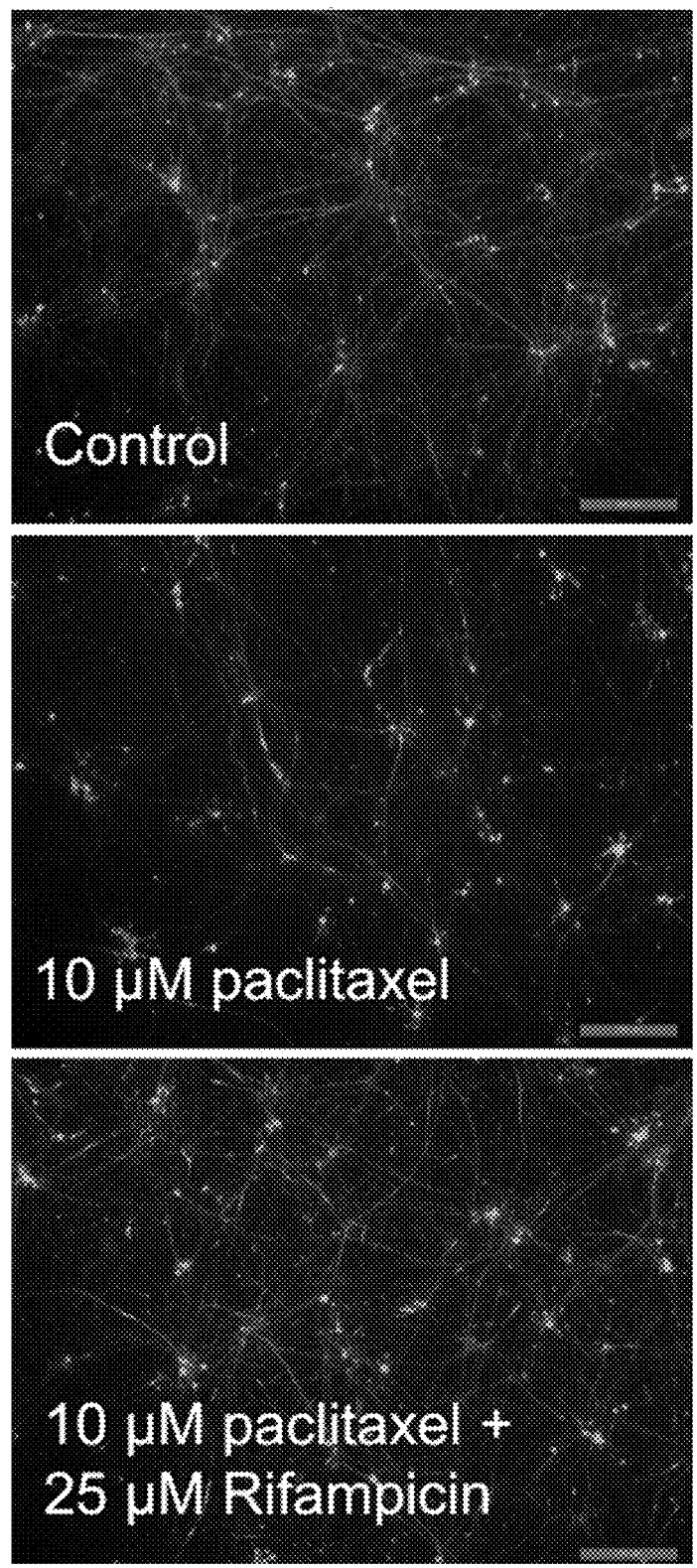
FIG. 5 shows that paclitaxel causes marked damage and that rifampicin can protect against this damage in sensory neurons derived from induced pluripotent stem cells. Cells were treated with paclitaxel for 24 hours and immunolabeled using an antibody for peripherin.

Low concentrations of rifampicin significantly increases the expression of the P-gp drug transporter (FIG. 4A) and reduces accumulation of paclitaxel by 3-fold (FIG. 4B). Higher expression of P-gp protects neuron from paclitaxel damage (FIG. 5).

Conclusion

These data clearly show that by adding a drug that increases the expression of drug transporters, the intracellular concentration of the chemotherapeutical paclitaxel is lowered.

These results directly support that by topically applying a P-gp inducer (and MRP1 inducer) to the skin, the amount of intracellular chemotherapeutic in the skin neurons can be lowered, and thereby also lowering the risk that the patient develops side effects of the chemotherapy, such as CIPN, while still maintaining the full effect of the chemotherapeutical at relevant location in the body (the cancer cells).

Further, since P-gp and MRP1 are known to be expressed in hair follicles (Osman-Ponchet et al. Drug Metabol Drug Interact. 2014), the same effect can be obtained for these cell types, thereby protecting the patient from hair loss.

Example 5—Vincristine Toxicity is Exacerbated with Inhibition of ABCC1 by MK-571

Aim of Study

To determine vincristine toxicity in sensory neurons and determine the impact of inhibiting the efflux transporter multidrug resistance-associated protein 1 (MRP1).

Materials and Methods

Sensory neurons were generated from human induced pluripotent stem cells (iPSCs) by implementing the well-established protocol by Chambers et. al. (Nat Biotech 2012). The neuronal differentiation was initiated when iPSCs achieved 70-80% confluency using KSR medium, which contained 82% KnockOut DMEM (Gibco, 10829-018) and 15% KnockOut Serum Replacement (KSR, ThermoFisher, 10828-028), 1% GlutaMAX-I (Gibco, 35050-038), 1% mini-mum essential medium non-essential amino acids (MEM-NEAA, Gibco, 11140-035), 1% P/S and 0.055 mM β-mercaptoethanol (Gibco, 21985023).

On days 0-5, SMAD signaling was inhibited by adding 0.1 µM LDN-193189 (Selleck, S7507) and 10 µM SB-431542 (Selleck, S1067) to the medium. Medium was changed daily, and N2 medium was added with 25% increments every other day starting on day 4 (100% N2 on day 10). N2 medium consists of 97% Neurobasal medium (Gibco, 21103-049) with 1% N2 Supplement (Gibco, 17502-048), 1% B27 Supplement (Gibco, 17504-044) and 1% P/S. On days 2-10, nociceptor induction was initiated with the addition of the three inhibitors, 3 µM CHIR99021 (Selleck, S1263), 10 µM SU5402 (Selleck, S7667) and 10 µM DAPT (Selleck, S2215).

For long-term cultivation starting on day 12, cells were washed with PBS+ and incubated with Accutase for 30 min to obtain a single-cell suspension. After incubation, the culture plates were gently rocked and cellular clumps were mechanically dissociated by pipetting up and down. The cells were filtered through a 40 µm nylon cell strainer (Corning, 431750) and centrifuged (800 rpm, 5 min, RT). Following resuspension of the pellet, iPSC-SNs were seeded as single cells on PLO/LAM/FN-coated culture plates at a density of 150,000 viable cells/cm$^2$. The long-term cultivation medium contained 100% N2 medium supplemented with 25 ng/mL nerve growth factor β (NGF-β, PeproTech, 450-01), brain-derived neurotrophic factor (BDNF, PeproTech, AF450-02), glial cell line-derived neurotrophic factor (GDNF, PeproTech, AF450-10), neurotrophin 3 (NT-3, PeproTech, 450-03) and 0.2 mM ascorbic acid (AA, Sigma, A4403).

The medium was changed every fifth day by gently removing half of the medium and replacing it with fresh long-term cultivation medium. To reduce the non-neuronal population, cells were treated with 1 µg/mL Mitomycin C (Sigma, M4287) for 2 hours on day 14. Once a week, laminin was added to the medium to maintain cell attachment.

Cells were treated with vincristine from 0.001-1 µM for 24 hours and immunolabeled with peripherin antibody. Quantification of network was done using ImageJ and MIPAR. In inhibition experiments, cells are pretreated with 4 µM MK-571 for one hour ahead of chemotherapy treatment.

Results

Figure 6:
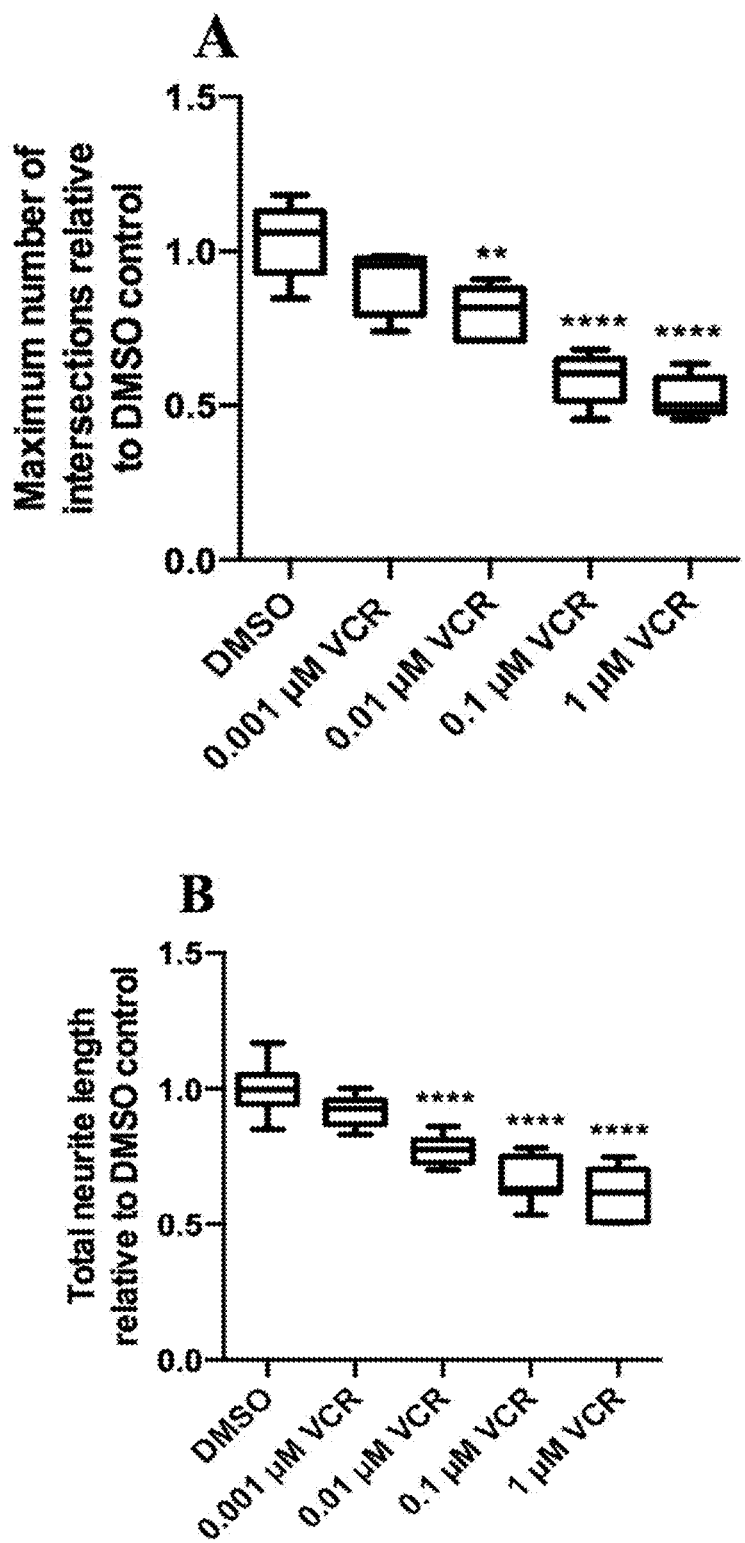
FIG. 6 shows that Vincristine (VCR) causes marked neurotoxicity at low concentrations. A) Number of neurites extending from a cluster of sensory neurons. B) Neurite length.

Vincristine (VCR) leads to substantial neurotoxicity in iPSC-derived sensory neurons. Thus, vincristine causes a dose-dependent decrease in number of neurites extending from a cluster of sensory neurons (FIG. 6A). Additionally, neurite length is shortened in a dose-dependent manner (FIG. 6B).

Figure 7:
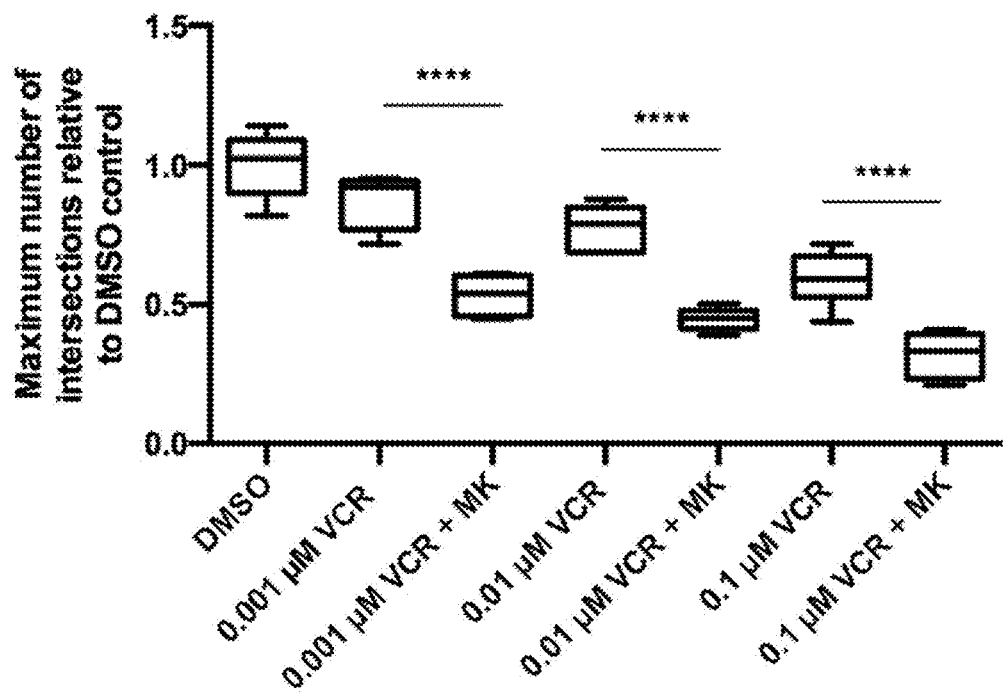
FIG. 7 shows that the MRP1 inhibitor MK-571 (MK) exacerbates vincristine (VCR) neurotoxicity markedly.

Inhibiting the efflux transporter MRP1 with MK-571 (MK) leads to substantially increased neurotoxicity even at low vincristine concentrations that are otherwise not toxic (FIG. 7).

Conclusion

These data indicate that vincristine causes substantial neurotoxicity in iPSC-derived sensory neurons. Additionally, inhibition of the efflux transporter MRP1 was shown to exacerbate vincristine-induced neurotoxicity.

These data also suggest that stimulating MRP1 would have the opposite effect and thus also that e.g. CIPN could be prevented by applying such MRP1 inducers to the skin.

Example 6—Vincristine Toxicity is Alleviated with Rifampicin Pre-Treatment

Aim of Study

To determine if rifampicin protects against vincristine-induced peripheral neuropathy.

Materials and Methods

Induced pluripotent stem cells were differentiated to sensory neurons for 35-40 days as described above. Rifampicin was added 48 hours ahead of vincristine to increase expression of efflux transporters.

Results

Figure 8:
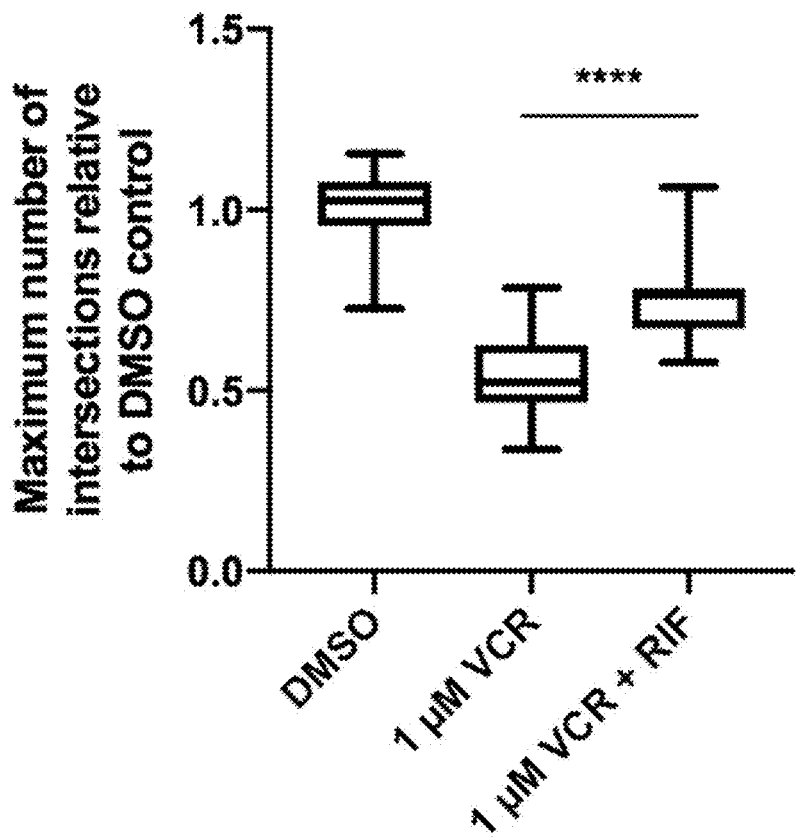
FIG. 8 shows that rifampicin (RIF) pretreatment substantially alleviates vincristine (VCR)-induced neurotoxicity.

Vincristine-induced neurotoxicity was substantially alleviated with pretreatment with 25 µM rifampicin (FIG. 8).

Conclusion

Rifampicin (RIF) protects against vincristine (VCR)-induced neurotoxicity likely through upregulation of the efflux transporter MRP1.

Example 7—Paclitaxel Increases Expression of the Pain-Sensing TRPV1 Receptor, Stress-Related ATF-3 and Rifampicin Protects Against this Transcriptional Response Aim of Study The aim of this study was to assess the transcriptional impact of chemotherapy treatment on the stress-related protein ATF-3 and the pain-sensing receptor TRPV1.

Materials and Methods

Induced pluripotent stem cells were differentiated to sensory neurons for 35-40 days as described above. Rifampicin was added 48 hours ahead of paclitaxel to increase expression of efflux transporters. Expression levels was determined using real-time qualitative polymerase chain reaction (RT-qPCR) for TRPV1 and ATF-3.

Results

Figure 9:
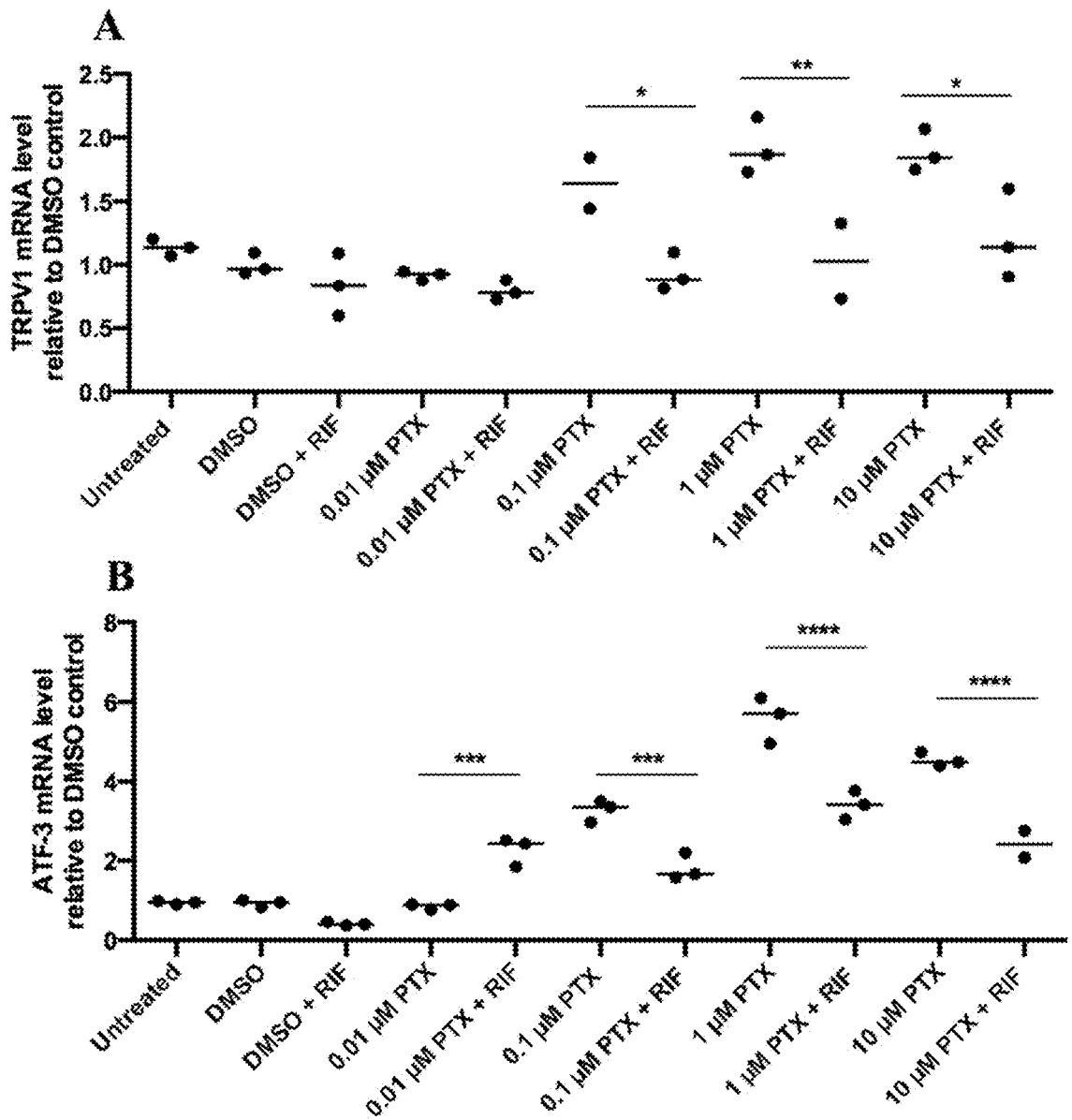
FIG. 9 shows that paclitaxel (PTX) causes dose-dependent increase in TRPV1 and ATF-3 expression. Pretreatment with rifampicin (RIF) protects against this transcriptional response, highlighting that rifampicin protects against paclitaxel-induced neurotoxicity.

Paclitaxel (PTX) causes substantially increased expression of both TRPV1 (FIG. 9A) and ATF-3 (FIG. 9B) in a dose-dependent manner. Pretreatment with rifampicin (RIF) protects against these transcriptional changes.

Conclusion

Rifampicin-induced upregulation of P-gp leads to lower intracellular concentrations of paclitaxel leading to protection against transcriptional changes caused by paclitaxel. This supports the claim that P-gp induction should protect against CIPN through limiting the intracellular concentrations of paclitaxel. Similar mechanisms are expected to limit chemotherapy disposition to hair follicles and thus protecting against *alopecia*.

Example 8— Rifampicin Pretreatment Reduces Intracellular Accumulation of Paclitaxel in iPSC-Derived Sensory Neurons Aim of Study To determine intracellular concentrations of paclitaxel in iPSC-derived sensory neurons and to assess if rifampicin pretreatment leads to lower accumulation.

Methods

Induced pluripotent stem cells were differentiated to sensory neurons for 35-40 days as described above. Rifampicin was added 48 hours ahead of paclitaxel to allow sufficient time to increase expression of efflux transporters. One and 5 µM paclitaxel was added to the cells for 1 hour and the cells were lysed using RIPA buffer. Paclitaxel concentrations was determined using an already established LC-MS/MS method.

Results

Figure 10:
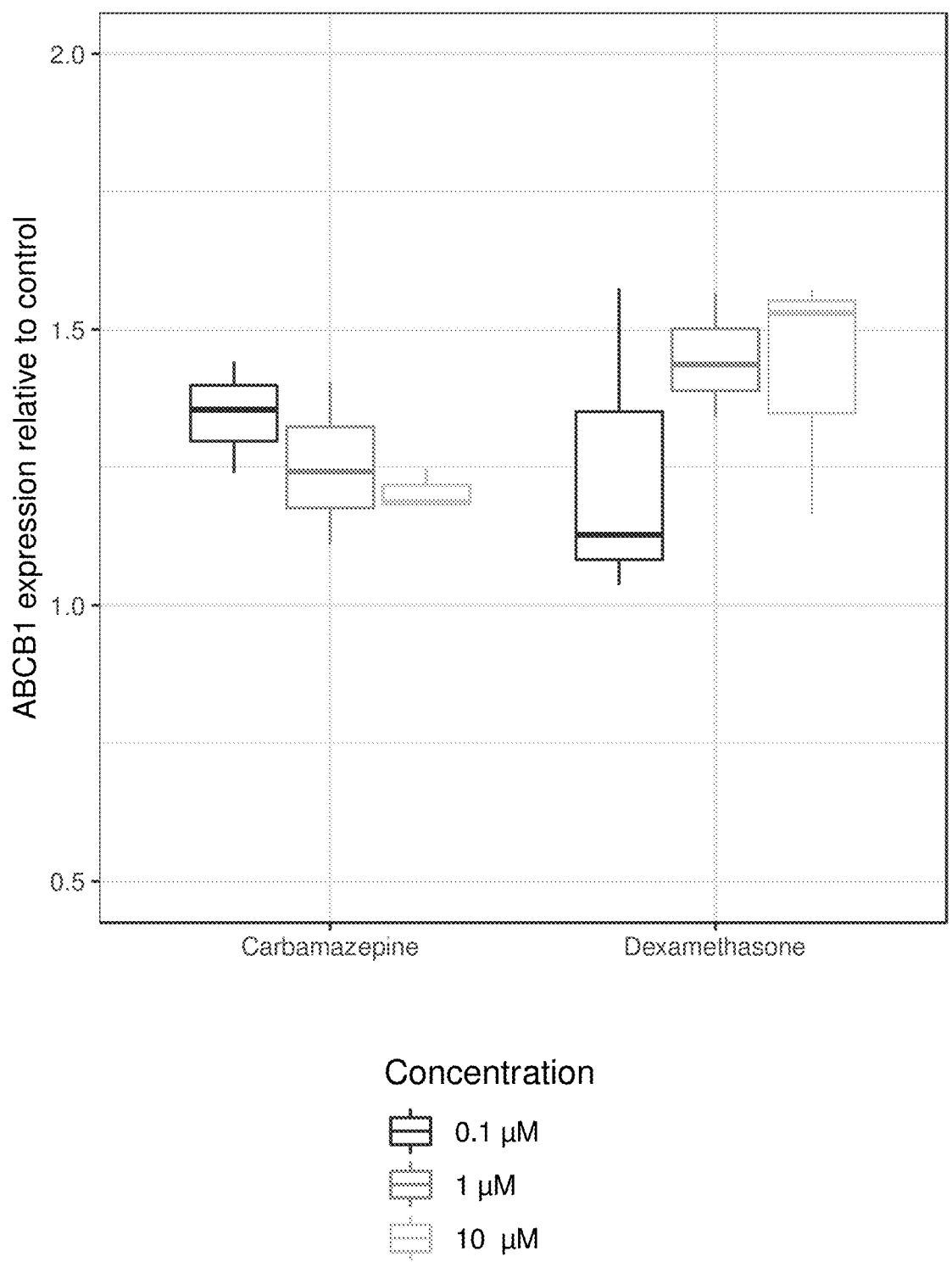
FIG. 10 shows that carbamazepine and dexamethasone increase expression of P-gp by up to 50% at different concentrations.

Intracellular concentrations of paclitaxel were approximately 3-fold lower after pretreatment with rifampicin (FIG. 10).

Conclusions

Rifampicin pretreatment leads to reduced accumulation of the chemotherapeutic paclitaxel causing reduced neuronal toxicity as described also above.

Example 9—Additional P-Gp Inducers in Sensory Neurons

Aim of Study

To confirm that additional PXR agonists, besides rifampicin, increase expression of P-gp in sensory neurons derived from induced pluripotent stem cells.

Material and Methods

Induced pluripotent stem cells were differentiated to sensory neurons for 35-40 days as described above. Cells were treated with carbamazepine and dexamethasone for 48 hours. Expression level of P-gp (ABCB1) was determined using real-time qualitative polymerase chain reaction (RT-qPCR) and adjusted for a housekeeping gene (GAPDH). Data are shown as relative expression to control (0.2% DMSO).

Results

Both carbamazepine and dexamethasone increase expression of P-gp by up to 50% (FIG. 10).

Conclusion

This example shows that drugs that activate PXR (exemplified by carbamazepine and dexamethasone), increase expression of P-gp in sensory neurons derived from induced pluripotent stem cells. This supports the claim that PXR agonists will be able to protect against chemotherapeutics that are substrates of P-gp such as paclitaxel, vincristine, bortezomib and ixabepilone by increasing expression of P-gp and reducing accumulation of these drugs in sensory neurons.

Example 10—Rifampicin in iPSC-Schwann Cell Precursors

Aim of Study

The aim of this study was to assess if rifampicin increases expression of P-gp in Schwann cells. Schwann cells are the principal glial cell in the peripheral nervous system. Schwann cells exist as both myelinating and non-myelinating and myelinating Schwann cells ensheath large-diameter neurons in layers of myelin, thus increasing conductance. Non-myelinating Schwann cells support neurons by secreting neuronal growth factors that play a crucial role in maintaining and repairing neurons following damage and may transmit pain signalling.

Materials and Methods

Induced pluripotent stem cells (iPSC) were differentiated into Schwann cell precursors using a previously published protocol. iPSC were plated onto growth factor-reduced Matrigel-coated culture dishes. The next day, the culture medium was switched from iPSC culture medium to neural differentiation medium (NDM) containing 1×$N_2$, 1×B27, 0.005% BSA, 2 mM GlutaMAX, 0.11 mM β-mercaptoethanol, 3 µM CT 99021, and 20 µM SB431542 in advanced DMEM/F12 and Neurobasal medium (1:1 mix). After 6 days of differentiation, the medium was replaced with neural induction medium containing 50 ng/mL NRG1 (this is designated Schwann cell precursor differentiation medium [SCPDM]) and replaced with fresh medium daily. The cells were routinely dissociated with Accutase treatment upon reaching 80% confluence and were expanded by additional cultivation in SCPDM. The hPSC-derived SCPs were generated after approximately 18 days of differentiation. SCPDM was used for the induction and maintenance of iPSC-derived Schwann cell precursors.

Schwann cell precursors were treated with rifampicine for 48 hours. Expression level of P-gp (ABCB1) was determined using real-time qualitative polymerase chain reaction (RT-qPCR) and adjusted for a housekeeping gene (GAPDH). Data are shown as relative expression to control (0.2% DMSO).

Results

Figure 11:
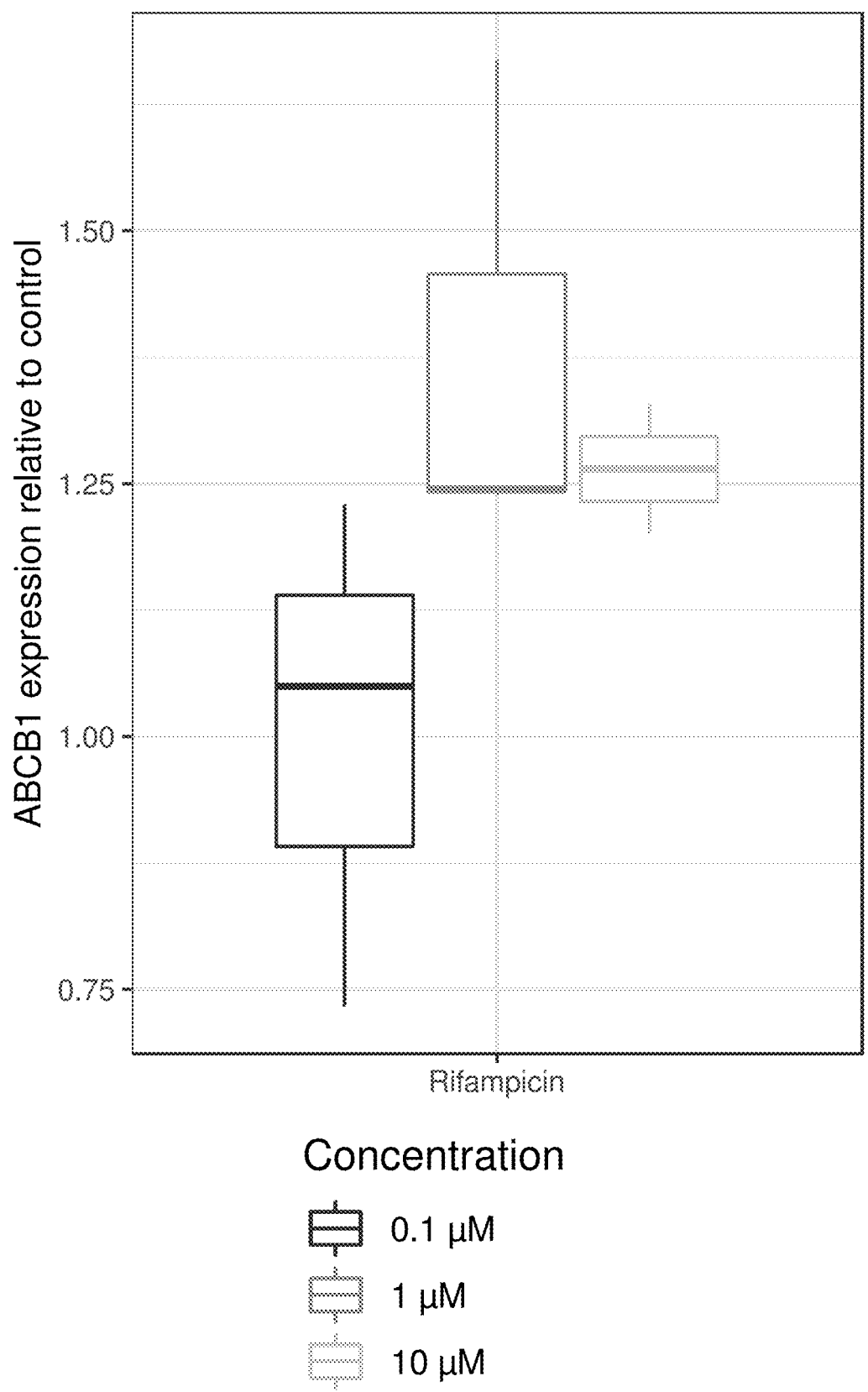
FIG. 11 shows that expression of P-gp is increased in a dose-dependent manner in Schwann cell precursors derived from induced pluripotent stem cells when treated with rifampicin.

Expression of P-gp was increased in a dose-dependent manner in Schwann cell precursors derived from iPSC (FIG. 11).

Conclusion

This study shows that rifampicin also increases expression of P-gp in other cells in the peripheral nervous system. This indicates that rifampicin may also protect Schwann cells from chemotherapy in addition to sensory neurons. Considering the unknown effect of chemotherapy on other cells besides sensory neurons in the peripheral nervous system, this is promising and may present a substantial advantage.

The invention claimed is:

1. A method of reducing chemotherapy-induced peripheral neuropathy (CIPN) in a subject in need thereof that will receive a chemotherapy, comprising:
    administering a topical composition comprising a therapeutically effective amount of a P-gp inducer selected from the group consisting of rifampicin, carbamazepine or dexamethasone to the subject; and
    administering a chemotherapeutic selected from the group consisting of taxanes, *vinca* alkaloids, epothilones, anthracyclines, proteasome inhibitors, altretamine and topoisomerase inhibitors to the subject.

2. The method of claim 1, wherein the P-gp inducer is rifampicin and the chemotherapeutic is paclitaxel or vincristine.

3. The method according to claim 1, wherein the topical composition is administered to a body part selected from the group consisting of hands, feet, arms and legs.

4. The method according to claim 1, wherein the chemotherapeutic is selected from the group consisting of Docetaxel, paclitaxel, Vincristine, Ixabepilone and Bortezomib.

5. The method of claim 1, wherein the P-gp inducer is administered to the subject more than one day before administering the chemotherapeutic to the subject.

6. The method of claim 1, wherein the topical composition is selected from the group consisting of a cream, foam, gel, lotion and ointment.

7. The method of claim 1, wherein the P-gp inducer further comprises one or more enhancers to enhance that the P-gp inducer reaches a dermis of the cells.

8. The method of claim 7, wherein the enhancer is selected from the group consisting of ethanol, glycols, phosphatidylcholine and sodium lauryl sulfate.

9. A method of reducing the risk of developing chemotherapy-induced peripheral neuropathy (CIPN) in a subject in need thereof that will receive a chemotherapy, comprising:
    administering a topical composition comprising a therapeutically effective amount of a P-gp inducer selected from the group consisting of rifampicin, carbamazepine or dexamethasone to the subject; and
    administering a chemotherapeutic selected from the group consisting of taxanes, *vinca* alkaloids, epothilones, anthracyclines, proteasome inhibitors, altretamine and topoisomerase inhibitors to the subject.

10. The method of claim 9, wherein the P-gp inducer is rifampicin and the chemotherapeutic is paclitaxel or vincristine.

11. The method according to claim 9, wherein the topical composition is administered to a body part selected from the group consisting of hands, feet, arms and legs.

12. The method according to claim 9, wherein the chemotherapeutic is selected from the group consisting of Docetaxel, paclitaxel, Vincristine, Ixabepilone and Bortezomib.

13. The method of claim 9, wherein the P-gp inducer is administered to the subject more than one day before administering the chemotherapeutic to the subject.

14. A method of reducing the severity of chemotherapy-induced peripheral neuropathy (CIPN) in a subject in need thereof that will receive a chemotherapy, comprising:
    administering a topical composition comprising a therapeutically effective amount of a P-gp inducer selected from the group consisting of rifampicin, carbamazepine or dexamethasone to the subject; and
    administering a chemotherapeutic selected from the group consisting of taxanes, *vinca* alkaloids, epothilones, anthracyclines, proteasome inhibitors, altretamine and topoisomerase inhibitors to the subject.

15. The method of claim 14, wherein the P-gp inducer is rifampicin and the chemotherapeutic is paclitaxel or vincristine.

16. The method according to claim 14, wherein the topical composition is administered to a body part selected from the group consisting of hands, feet, arms and legs.

17. The method according to claim 14, wherein the chemotherapeutic is selected from the group consisting of Docetaxel, paclitaxel, Vincristine, Ixabepilone and Bortezomib.

18. The method of claim 14, wherein the P-gp inducer is administered to the subject more than one day before administering the chemotherapeutic to the subject.

* * * * *